(12) United States Patent
Patil et al.

(10) Patent No.: US 12,380,715 B2
(45) Date of Patent: Aug. 5, 2025

(54) IMAGE DATA ANNOTATION AND MODEL TRAINING PLATFORM

(71) Applicant: Target Brands, Inc., Minneapolis, MN (US)

(72) Inventors: Arun Patil, Karnataka (IN); Snigdha Samal, Karnataka (IN); Mohit Sethi, Karnataka (IN); Neha Dixit, Karnataka (IN); Anil Prasad, Karnataka (IN); Mohammed Jafer, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 412 days.

(21) Appl. No.: 18/069,913

(22) Filed: Dec. 21, 2022

(65) Prior Publication Data

US 2024/0212371 A1 Jun. 27, 2024

(51) Int. Cl.
*G06V 20/70* (2022.01)
*G06V 10/70* (2022.01)
(Continued)

(52) U.S. Cl.
CPC ............ *G06V 20/70* (2022.01); *G06V 10/764* (2022.01); *G06V 10/768* (2022.01); *G06V 10/774* (2022.01); *G06V 10/776* (2022.01)

(58) Field of Classification Search
CPC .... G06V 20/70; G06V 10/764; G06V 10/768; G06V 10/774; G06V 10/776; G06V 10/82; G06V 10/25; G06V 20/52; G06V 10/26; G06V 10/751; G06V 10/454; G06V 10/74; G06V 10/7715; G06Q 10/087; G06N 3/045; G06N 3/08; G06N 20/00; G06F 18/214; G06F 18/22; G06F 18/211; G06F 18/2148; G06F 18/2155; G06F 18/24;
(Continued)

(56) References Cited

U.S. PATENT DOCUMENTS 10,474,992 B2   11/2019   Fisher et al.
10,529,137 B1   1/2020    Black et al.
(Continued)

FOREIGN PATENT DOCUMENTS

WO   2021156974 A1   8/2021

OTHER PUBLICATIONS

Innodata—Image Annotation and Data Annotation; Feb. 23, 2022; 33 Pages.
(Continued)

*Primary Examiner* — Michael S Osinski
(74) *Attorney, Agent, or Firm* — Merchant and Gould, PC

(57) ABSTRACT

A platform for data collection, and in particular image collection, and model building therefrom is disclosed. In examples, received media content data, including image data, may be assigned a context category, and one or more context-specific models may be used to automatically annotate the image. Accuracy monitoring of the image annotations may indicate a need to manually annotate images for subsequent training. A priority may be assigned to one or more images, such that images may be queued for additional annotation. Such additional annotations may be used for model retraining. In some instances, a separate classification model may be used to identify a context category for image data from among predetermined contexts.

24 Claims, 10 Drawing Sheets

(51) Int. Cl.
*G06V 10/764* (2022.01)
*G06V 10/774* (2022.01)
*G06V 10/776* (2022.01)

(58) Field of Classification Search
CPC ....... G06F 18/2431; G06T 2207/20081; G06T 2207/20084; G06T 7/70; G06T 2207/30232; G06T 7/60; G06T 7/73; G06T 11/60; G06T 2207/30196; G06T 7/11

See application file for complete search history.

(56) References Cited

U.S. PATENT DOCUMENTS

| | | | |
|---|---|---|---|
| 10,565,548 B2* | 2/2020 | Skaff | G06Q 10/087 |
| 10,929,721 B2 | 2/2021 | Dupont De Dinechin et al. | |
| 11,023,850 B2* | 6/2021 | Fisher | G06T 7/292 |
| 11,030,482 B2 | 6/2021 | Hayashi et al. | |
| 11,183,293 B2 | 11/2021 | Lu et al. | |
| 11,257,575 B2 | 2/2022 | Lyman et al. | |
| 11,537,824 B2* | 12/2022 | Ringuette | H04N 1/00461 |
| 11,567,991 B2* | 1/2023 | Garrett | G06F 16/5866 |
| 11,971,955 B1* | 4/2024 | Chakraborty | G06F 3/04845 |
| 12,136,061 B2* | 11/2024 | Patil | G06V 20/52 |
| 2010/0177956 A1* | 7/2010 | Cooper | G06V 20/70 382/159 |
| 2011/0158534 A1* | 6/2011 | Fahn | G06T 7/187 382/180 |
| 2015/0242706 A1 | 8/2015 | Brown | |
| 2017/0178310 A1* | 6/2017 | Gormish | G06T 7/30 |
| 2018/0260767 A1* | 9/2018 | Findlay | G06Q 10/087 |
| 2020/0005225 A1* | 1/2020 | Chaubard | H04N 23/54 |
| 2020/0167566 A1* | 5/2020 | Marder | G06V 10/7753 |
| 2020/0193222 A1* | 6/2020 | Singh | G06N 3/08 |
| 2020/0272854 A1 | 8/2020 | Caesar | |
| 2020/0394515 A1 | 12/2020 | Koike | |
| 2021/0035015 A1 | 2/2021 | Edgar et al. | |
| 2021/0166037 A1* | 6/2021 | Higa | G06T 7/254 |
| 2021/0183499 A1 | 6/2021 | Barkan et al. | |
| 2021/0256546 A1* | 8/2021 | Hajian | H04L 51/08 |
| 2021/0287091 A1* | 9/2021 | Ge | G06V 10/774 |
| 2021/0312227 A1* | 10/2021 | Moradiannejad | G06F 18/214 |
| 2021/0366099 A1 | 11/2021 | Liao et al. | |
| 2022/0027666 A1* | 1/2022 | Murugaraj | G06V 10/25 |
| 2022/0114389 A1* | 4/2022 | Ghose | G06V 10/25 |
| 2023/0079388 A1* | 3/2023 | Fisher | G06T 7/60 382/103 |
| 2023/0206661 A1* | 6/2023 | Choi | H04N 5/265 382/156 |
| 2023/0245370 A1* | 8/2023 | Jo | G06V 10/74 |
| 2024/0078681 A1* | 3/2024 | Franchini | G06V 20/70 |
| 2024/0078787 A1* | 3/2024 | Taghavi | G06V 10/762 |
| 2024/0177456 A1* | 5/2024 | Chondro | G06V 20/70 |

OTHER PUBLICATIONS

Bernhardt et al., Active Label Cleaning for Improved Dataset Quality Under Resource Constraints: 2022, 11 Pages.

* cited by examiner

800

802 Receive input media content data, including input image data comprising at least one image, where the at least one image has associated with it a context category;

804 Automatically assign, based at least in part on the context category of the at least one image, one or more annotations to the at least one image;

806 Determine whether the at least one image requires additional annotation;

808 If the at least one image does not require additional annotation:
Store the at least one image and its assigned annotations in a central database;

810 If the at least one image requires additional annotation:
    Assign a priority to the at least one image, based on one or more enterprise factors, wherein the priority includes a position in a queue of a plurality of images, wherein each of the plurality of images requires additional annotation;
    Assign, according to the assigned priority, one or more additional annotations to the at least one image; and
    Store the at least one image and its assigned annotations and additional annotations in the central database

FIG. 8

IMAGE DATA ANNOTATION AND MODEL TRAINING PLATFORM

BACKGROUND

An enterprise may utilize media content data in a multitude of ways to benefit its business operations. An enterprise may utilize media content, including images, in advertising and marketing campaigns, to attract new customers and retain or increase the patronage of new customers. An enterprise may also utilize media content, including images, to analyze product shelf placement; build or train machine learning models; detect safety hazards in brick-and-mortar stores, warehouses, mixing centers, parking lots, or other physical areas; or to perform myriad other important tasks. In these uses, images may be annotated (e.g. labeled or tagged) to identify key features associated with the images, so that they may be utilized for beneficial purposes by the enterprise. Annotations which are inaccurate or less relevant to enterprise interests makes it difficult for enterprise users to identify and select appropriate images for use and detect important features of selected images. Additionally, artificial intelligence applications which may annotate images will not produce the mist accurate or relevant annotations if they are not regularly re-trained. Because images may be generated and used by many different users within an enterprise, piecemealed storage of images may lead to inefficient use of the image data resources.

SUMMARY

An enterprise may utilize media content data, including image data, in a multitude of ways to benefit its business operations, and this image data may include annotations to aid users in finding and utilizing the images. Images and other types of media content may be received at an enterprise system for annotation. If these images/media do not have an associated context category, they may be analyzed by context model (which may be an artificial intelligence model) which will determine a context category for each image. Images with associated context categories may be assigned annotations by one or more annotation models, which may be artificial intelligence models, and which may assign annotations (for example, labels or tags) such as colors, object recognition, and/or speech recognition to the images. Annotated images may be stored in a central database, where they may be accessed by enterprise users from different enterprise functional groups and utilized for various purposes. In some examples, a priority model (which may be an artificial intelligence model) may determine that an annotated image needs more or different annotations. These images may be assigned a priority for a place in a queue for further annotation. Once further annotated, the images may then be stored in the central database. In some examples, the artificial intelligence models may be retrained using the annotated images.

In a first example aspect, a method includes receiving input media content data, including input image data, the input image data comprising at least one image, wherein the at least one image has an associated context category. The method includes automatically assigning, based at least in part on the context category of the at least one image, one or more annotations to the at least one image. The method further includes determining whether the at least one image requires additional annotation based on an observed annotation accuracy threshold. If the at least one image does not require additional annotation, the method includes storing the at least one image and its assigned annotations in a central database, wherein the central database is accessible to a plurality of enterprise users. The method further includes, if the at least one image requires additional annotation: assigning a priority to the at least one image, based on one or more enterprise factors, wherein the priority includes a position in a queue of a plurality of images, wherein each of the plurality of images requires additional annotation; assigning, according to the assigned priority, one or more additional annotations to the at least one image; and storing the at least one image and its assigned annotations and additional annotations in the central database.

In a second example aspect, a system is disclosed that includes an annotation platform and a prioritization platform. The annotation platform includes a first computer system configured to: receive input media content data, including input image data, the input image data comprising at least one image, wherein the at least one image has associated with it a context category; assign, at a context-specific annotation model, based at least in part on the context category of the at least one image, one or more annotations to the at least one image; and store the at least one image and the one or more annotations in a central database. The prioritization platform is implemented on a second computer system communicatively connected to the first computer system, and executes instructions to determine whether the at least one image requires additional annotation. If the at least one image does not require additional annotation, the prioritization platform stores the at least one image and its assigned annotations in a central database, wherein the central database is accessible to a plurality of enterprise users. If the at least one image does require additional annotation, the prioritization platform is configured to: assign a priority to the at least one image, based on one or more enterprise factors, wherein the priority includes a position in a queue of a plurality of images, wherein each of the plurality of images requires additional annotation; receive, from an annotating user, one or more additional annotations associated with the at least one image; and store the additional annotations in the central database in association with the image.

In a third example aspect, a method includes receiving, at an annotation platform, input media content data from a real-time inputs source. The input media content data includes input image data, the input image data comprises a plurality of images, and each of the plurality of images has associated with it a context category, wherein the context category is associated with the real-time inputs source, and wherein the annotation platform comprises one or more annotation models. The method further includes, based on the context category associated with each of the plurality of images, assigning each of the plurality of images to at least one of the one or more annotation models. The method also includes automatically assigning, based at least in part on the context category of each of the plurality of images, one or more annotations to each of the plurality of images. The method includes observing a quality of each of the assigned one or more annotations, and determining, at a prioritization application, whether each of the plurality of images requires additional annotation, based at least in part on the observed quality of the one or more annotations assigned to each of the plurality of images. The method includes, in response to observing an increase in quality of a first subset of the one or more annotations or no change in the quality of the first subset of the one or more annotations: determining that a first subset of the plurality of images to which the first subset of the one or more annotations are assigned do not require additional annotation; and storing each image of the first subset and one or more assigned annotations assigned to each image of the first subset in a central database, wherein the central database is accessible to a plurality of enterprise users. The method also includes, in response to observing a decrease in quality of a second subset of the one or more annotations: determining that a second subset of the plurality of images to which the second subset of the one or more annotations are assigned requires additional annotation; and assigning a priority to each image of the second subset, based at least in part on the observed decrease in quality. The priority includes a position in a queue, and the position in the queue defines an order of additional annotation. The method further includes assigning, according to the order of additional annotation, one or more additional annotations to each image of the second subset, and storing each image of the second subset and the one or more assigned annotations and the one or more additional annotations assigned to each image of the second subset in the central database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 8 illustrates an example method for annotating images and prioritizing data for additional annotation, according to an example.

DETAILED DESCRIPTION

Figure 1:
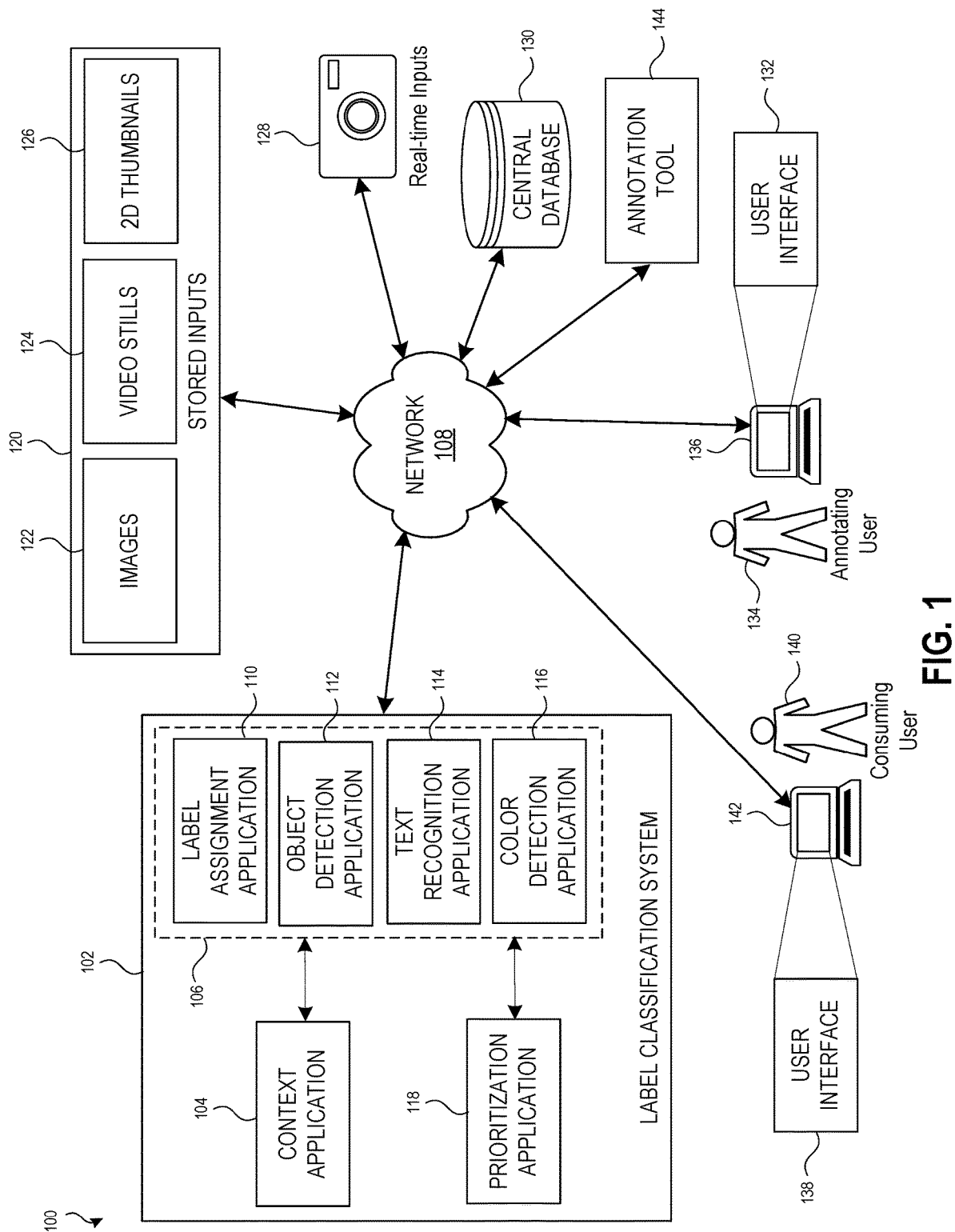
FIG. 1 illustrates an example system for annotating images and prioritizing data for additional annotation, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An enterprise may utilize media content data, including image data, in a multitude of ways to benefit its business operations. An enterprise may utilize images in advertising and marketing campaigns, to attract new customers and retain or increase the patronage of new customers. An enterprise may also utilize images to analyze product shelf placement; train or build machine learning models; detect safety hazards in brick-and-mortar stores, warehouses, mixing centers, parking lots, or other physical areas; or to perform myriad other important tasks. In these uses, images may be annotated (e.g. labeled or tagged) to identify key features associated with the images, so that they may be utilized for beneficial purposes by the enterprise. For example, annotations may include identification of objects included within an image, or characteristics of objects depicted in the image.

Annotations which are inaccurate or less relevant to enterprise interests make it difficult for enterprise users to identify and select appropriate images. Annotating a large number of images accurately may be time-consuming for the enterprise. Annotations by humans may also be subject to human error; a human annotator (especially one who is tasked to annotate a large number of images) may miss or mischaracterize an annotation. Additionally, artificial intelligence applications which may annotate images will not produce the most accurate or relevant annotations if they are not regularly re-trained. Because images may be generated and used by many different users within an enterprise, piecemeal storage of images may lead to inefficient use of the image data resources.

Generally, this disclosure relates to a system for analyzing collected image data and managing a decisioning process for determining when annotation of images is required. Such a decision process allows for monitoring of large-scale image aggregation processes used to create large-scale datasets, while ensuring that model building, store monitoring, or marketing may be performed with adequate accuracy. In accordance with example aspects, example disclosed systems may prioritize certain data for annotation to improve the built models, based on selected enterprise criteria.

In some examples, media content including images may be received at an enterprise system for annotation. In some examples, the images may not have an associated context category. In some examples, such as in the case of images obtained from real-time imaging systems, received images may have an associated context category (e.g., a location, a time, and optionally a type of item expected to be present within the image). If these images do not have an associated context category, they may be analyzed by a context model (which may be an artificial intelligence model), which may have been trained on an open image dataset, and which may identify a general context category to be associated with the image(s) (for example, such as apparel, bathroom, interior, shelf, kitchen, or a store department or planogram). Images with associated context categories may be assigned annotations by one or more annotation models, which may be artificial intelligence models, and which may assign annotations such as labels, colors, object recognition, and/or speech recognition to the images.

The annotated images may be stored in a centralized database for retrieval and reuse by enterprise users from different enterprise functional groups and utilized for various purposes.

In some examples, a priority model (which may be an artificial intelligence model) may determine that a specific model used to identify and annotate images may need to be retrained. This may be because, for example, the model is designed to identify an object (e.g., a particularized object, or a class of objects), but that object's appearance has changed (e.g., a packaging change for a retail item on a shelf). In such instances, images captured of that object may need to be annotated manually, with updated annotations provided for retraining of the model that is used for automated identification and annotation thereafter. In such cases, the specific images that need to be manually annotated may be assigned a priority for a place in a queue for further annotation. Such prioritization may be performed based on, e.g., business importance, level of inaccuracy, and the like.

For example, a camera within a store may capture an image, but the resulting analysis of the image, e.g., via an object recognition model, may not result in product identification within a desirable accuracy level. The inability to provide accurate identification within a predetermined threshold of acceptability may be a result of incorrect annotations or a lack of annotations on the products, and may be the result of inadequate data, bad lighting, and the like. Thus, the feed for the camera or images the algorithm obtains from the camera may be prioritized for annotating by an annotator. This will increase the usefulness of the image and its data for users. In some examples, other types of data may be flagged for further annotation. Images captured at cameras facing a truck distribution parking lot may be analyzed to identify vehicles, people, and other objects. Annotating this data may provide important safety information about, e.g., timing of traffic, traffic density, hazardous conditions detected, and the like.

To further determine which cameras/data feeds the algorithm should prioritize, the algorithm may also include specified factors in the determination. One such factor may be what the camera's view encompasses. In one example, the camera may focus on shelves of a retail store location, and a model associated with the particular camera view may be trained to detect empty shelves and generate an alert in response. In that example, if product detection rates are low from captured images, the model may need to be retrained on new product items to avoid "false positive" empty shelf alerts from being generated. Accordingly, the algorithm would assign a high prioritization for annotation. In a different case, the camera may overlook an aisle that has a high amount of guest traffic. If product identification is low within models associated with that particular view, the algorithm may flag images captured by this camera as high priority for manual annotation, for example to retrain an object identification model with a goal to increase product identification for that particular camera.

In addition, the algorithm can prioritize annotation of images associated with a particular viewpoint or scene where previously observed images of objects lack accurate labels. Some images may not capture a quality view of an object, or background objects may exist in the image that might interfere with labeling the object. Thus, these images may be prioritized for annotation so the objects can have better labels. Once the object, such as a product, has a better label, the annotations and labels can contribute to better model building for product identification. Then, the models can better label/annotate products and other objects within a scene of an image automatically in subsequently-captured images, and may allow for more efficient and complete reverse product searching and/or text searching.

Once further annotated, the images may then be stored in the central database. In some examples, associated artificial intelligence models may be retrained using the annotated images. Ensuring accurate and relevant annotations are assigned to the images, which are then utilized for retraining, ensures that a retrained model will have greater accuracy. Models of the system may use various techniques for image detection and labeling. Machine learning models can be taught to better identify different aspects of the images. For example, an image may contain a light blue shirt on a male model. One machine learning model may analyze the image and determine that the shirt is light blue and another model may determine that the person wearing the shirt is a male. These determinations may use the earlier added annotations. Thus, prioritizing images of important or popular products for annotation will improve labeling models for products that are more likely to be of interest. After re-training, the models can better recognize and/or predict labels, colors, texts, and objects, increasing the performance of cameras and increasing the value and usefulness of future annotated stored images.

These and other examples will be explained in more detail below with respect to FIG. 1-FIG. 10.

FIG. 1 illustrates an example system 100 for annotating images and prioritizing data for additional annotation, according to an example. As will be described in more detail below, the system 100 may include a label classification system 102, context application 104, one or more annotation models 106, network 108, label assignment application 110, object detection application 112, text recognition application 114, color detection application 116, prioritization application 118, stored inputs 120, images 122, video stills 124, 2D thumbnails 126, real-time inputs 128, central database 130, annotation user interface 132, annotating user 134, enterprise user device 136, consumer user interface 138, consuming user 140, user device 142, and annotation tool 144.

In an example, label classification system 102 may include context application 104, one or more annotation models 106, and prioritization application 118. In some examples, label classification system 102 may receive input data from, or may output data to: stored inputs 120, real-time inputs 128, central database 130, annotation tool 144, enterprise user device 136, and/or user device 142, as will be discussed herein. The various input data and/or output data may be communicated to label classification system 102 via network 108.

In some examples, as described herein, network 108 may include a computer network, an enterprise intranet, the Internet, a LAN, a Wide Area Network (WAN), wireless transmission mediums, wired transmission mediums, other networks, and combinations thereof. Although network 108 is shown as a single network in FIG. 1, this is shown as an example and the various communications described herein may occur over the same network or a number of different networks.

In some examples, label classification system 102 may include context application 104. In some examples, context application 104 may receive images (input data) received from stored inputs 120 which lack an associated context. Context application 104 may assign an appropriate context to the images. In some examples, context application 104 may be a machine learning/artificial intelligence model. In some examples, context application 104 may receive inputs or send outputs via network 108.

In some specific examples, context application 104 may be configured to receive image data lacking context information associated therewith at the time of capture or receipt of that image data at the label classification system 102, and identify a specific context in which the image was captured. This may allow for appropriate selection of one or more subsequently-applied models for object recognition and identification, used for annotation as described further below. In other examples, where context is received alongside an image, the context application 104 may not need to be used to identify a specific subsequent model for use.

For example, in some embodiments, context application 104 may identify an image as a scene, as an image of apparel of some type, as an image of a shelf within a retail store, etc. The image may otherwise lack accompanying information about its time of capture or intended content. For example, in the context of a retail enterprise, image data may be received from third parties, such as vendors or customers, representing items offered for sale by the retail enterprise, but which are unlabeled with a context in which the image was captured. Generally speaking, individual models used for automatic image annotation, within the annotation models 106 that are described below, have a higher degree of accuracy when trained with a narrower set of data specific to the context in which the model is to be used. By using a general purpose classifier model used to identify image context, a subsequent model (or models) may be selected for use in performing annotation of the image(s).

In some examples, annotation models 106 may include one or more of label assignment application 110, object detection application 112, text recognition application 114, and color detection application 116. In some examples, the annotation models 106 may be machine learning/artificial intelligence models. In some examples, the annotation models 106 may be trained using previously annotated images. In some examples, the annotation models 106 may be built as classification models. Each of the applications included in the annotation models 106 may comprise one or more individual models. In some examples, one or more of the annotation models 106 may determine and provide a confidence level associated with the annotations that they assign.

In some examples, label assignment application 110 may be configured to generate labels, including labels related to color, category, objects, people, embeddings, object or person characteristics, products, or others. In some examples, label assignment application 110 may be a multi-label classification model. In some examples, there is no constraint on how many classifications (e.g. labels, attributes, tags) may be assigned to an image. In some examples, label assignment application may provide contextual information about objects or people within an image. In some examples, label assignment application 110 may analyze the image and assign labels before or after other models of annotation models 106.

In some examples, label assignment application 110 may include one or more sub-models. The one or more sub-models may include label assignment models of a first type trained on large datasets of images with known assigned attributes, which may include thousands of images from many different contexts. In some examples, the one or more sub-models may include label assignment models of a second type trained on datasets of images with known assigned attributes, images from a particular context. In some examples, this context may be in line with a product category related to a segment of products sold by the enterprise, for example: apparel, bathroom, interior, kitchen, home and garden, seasonal/holiday, pet, toys, automotive, cleaning, food, frozen, and others. In some examples, the one or more sub-models may include label assignment models of a third type trained on datasets of images with known assigned attributes, images from a set of particular contexts (for example, two or more particular contexts of the examples listed above). In some examples, the one or more sub-models may operate in parallel to process an image. In some examples, one or more of the sub-models may have a Res-Net architecture.

In some examples, sub-models of the first type may detect and assign labels for scene types and areas, such as indoor, outdoor, kitchen, living room, shelf, and others. In some examples, sub-models of the second and third types may detect and assign labels for specific objects, people, and/or products (for example, pillow, duvet, mattress, quilt, etc.).

In some examples, label assignment application 110 may analyze the image and assign labels before or after other models of annotation models 106.

In some examples, object detection application 112 may be configured to detect objects within data such as an image. In some examples, objects may include generic objects (for example, shirt, hat, pillow, chair). In some examples objects may include specific products offered for sale by the enterprise. In some examples, object detection application 112 may provide the list, count, and/or location of one or more detected objects. In some examples, detected objects may be indicated by a bounding box associated with the object of the image. In some examples, an annotation associated with a detected object may be assigned to (associated with) the image. In some examples, no objects are detected within an image. In some examples, one or more objects are detected within an image. In some example, object detection application 112 may be a region-based combinational neural network (RCNN) model and/or ResNet based model.

In some examples, text recognition application 114 may be configured to detect text within an image. In some examples, text may include words, phrases, letters, numbers, logos, or other symbols. In some examples, detected text may be associated with a context or with a detected object. In some examples, an annotation associated with detected text may be assigned to (associated with) the image. In some examples, no text is detected within an image. In some examples, one or more texts are detected within an image. In some examples, text recognition application 114 may be a ResNet-50 based model, and may be either trained using contextual image samples with text, or a pre-trained model.

In some examples, color detection application 116 may be configured to detect colors within an image. In some examples, detected color may be associated with a context or with a detected object. In some examples, detected color may be associated with pixels within a bounding box on the image. In some examples, detected color may be associated with an overall dominant color hue of the image. In some examples, an annotation associated with a detected color may be assigned to (associated with) the image. In some examples, no color annotations are assigned to an image. In some examples, one or more color annotations are assigned to an image.

In some examples, the annotation models 106 (including label assignment application 110, object detection application 112, text recognition application 114, and color detection application 116) may assign annotations based at least in part on a context associated with the image.

In some examples, label classification system 102 may include prioritization application 118. In some examples, prioritization application 118 may receive images which have been annotated by annotation models 106 (in some examples, the annotated images may be stored in central database 130), and which are annotated with labels having an associated certainty below a predetermined threshold. In further examples, prioritization application 118 may receive images that would otherwise be annotated by such annotation models 106, but which are not yet annotated and designated for annotation by an annotating user. In still further examples, the prioritization application 118 receives statistics regarding accuracy of previous annotations, for example based on feedback from downstream systems using those annotated images. Such feedback may include corrections to annotations, or a notification that an annotation was erroneous (e.g., the annotation identified an object incorrectly, incorrectly identified a product as being out of stock, and the like).

In some examples, prioritization application 118 may be a machine learning/artificial intelligence model. In other examples, prioritization application 118 may implement one or more definable business rules for prioritizing images for annotation. In some examples, prioritization application 118 may receive inputs or send outputs via network 108.

In some examples, stored inputs 120 may include one or more media content inputs. Media content inputs may include various types of media, including 2D images, 3D models, video, and/or audio. In some examples, images (as further described below) may include images 122, video stills 124, and/or 2D thumbnails 126. In some examples, stored inputs 120 are stored in a location separate from central database 130. In some examples, stored inputs 120 are stored within central database 130. Stored inputs 120 may be stored in one or more various databases, which may be virtual (e.g. cloud-based; in other examples, they may network-based or drive-based. In some examples, stored inputs 120 may be fed to label classification system 102 as input data (images) for annotation models 106. In some examples, images stored within stored inputs 120 include an associated context. In some examples, images stored within stored inputs 120 do not include an associated context. In some examples, images stored within stored inputs 120 do not include annotations. In some examples, images stored within stored inputs 120 originate from a real-time input 128. In some examples, images stored within stored inputs 120 do not originate from a real-time input 128. In some examples, stored inputs 120 may receive inputs or send outputs via network 108.

In some examples, images 122 may be images captured by a camera. In some examples, images 122 may have originated from real-time inputs 128. In some examples, images 122 may not have originated from real-time inputs 128 (for example, may have been captured by a professional photographer or amateur photographer). In other examples, images 122 may be automatically captured scenes of known locations, within which objects are to be detected.

In some examples, video stills 124 may be images captured from a video file. In some examples, video stills 124 may have originated from real-time inputs 128. In some examples, video stills 124 may not have originated from real-time inputs 128 (for example, may have been captured by a professional videographer or amateur videographer).

In some examples, 2D (two-dimensional) thumbnails 126 may be images captured from a (three-dimensional) 3D file. In some examples, 2D thumbnails 126 may have originated from real-time inputs 128. In some examples, 2D thumbnails 126 may not have originated from real-time inputs 128. In some examples, a 3D file may be a computer-drafted model of one or more objects, a point-cloud model (for example, one generated via laser scan), a 3-D photograph or video model captured by a still camera or video camera, or other appropriate 3D file type.

In some examples, images, stills, thumbnails, videos, and 3D files mentioned herein may be of various appropriate file types including, but not limited to: gif, jpg, png, tiff, psd, pdf, eps, RAW, svg, bmp, raster, AI format, indd, WebP, heif, mov, MPEG-4, h.264, MP4, wmv, flv, avi, WebM, mkv, avchd, CAD-supported files (such as dwg, dxf, stl, dgn, dwf, and others), stl, step, obj, 3ds, vrml/x3D, fbx, dae, iges, amf, 3mf, MP3, USDZ, gITF, glb, Collada, Blend, and others. In some examples, file types may correspond to a container (the format or package of the media) or a codec (for compressing or encoding video or other data). For example: h.264 and MPEG-4 are examples of codecs; mov and MP4 are examples of containers.

Herein, when "images" or "input data" or input images" are generally referred to in this application and examples, any of the above-described data formats (for example, any data included in stored inputs 120 or central database 130) may be implicated (i.e. these terms do not limit the descriptions to only images 122), and may include images, video, audio, or other media files.

In some examples, media content, including images, may originate from real-time inputs 128. In some examples, real-time inputs 128 may include a camera located in a retail store of the enterprise. Such cameras may be located at entrances/exits of the retail location and oriented to capture images of individuals entering/exiting. Cameras may also be located within loading/unloading areas, or within a retail sales floor and trained on objects to detect presence/absence of items for sale, carts, trailers to be loaded/unloaded, and the like. The camera may capture images, videos, and/or 3D scans (in some examples, stills or thumbnails may be captured from the videos and/or 3D scans) of retail store shelves, tables, racks, cabinets, or other merchandise displays. In some examples, real-time inputs 128 may receive inputs or send outputs via network 108. In some examples, images which originate from real-time inputs 128 may have an associated context, which may relate to the environment in which the image was taken (for example, a particular type of product category display, etc.). In some examples, images captured from real-time inputs 128 may be stored in stored inputs 120, central database 130, or another suitable database or storage location.

In some examples, central database 130 may store any or all of: wholly or partially annotated images, images with or without associated context, unannotated images, images to be used in training or retraining annotation models 106, and/or other data or metadata associated with images. In some examples, central database 130 may receive inputs or send outputs via network 108.

In some examples, annotating user 134 may utilize annotation tool 144 via annotation user interface 132 on annotation user device 133 to manually annotate images which have been prioritized for annotation by prioritization application 118.

In an example, annotating user 134 is an employee, operator, manager, or other agent of the enterprise.

In some examples, annotation user device 136 may be a desktop computer, a laptop computer, a tablet, a cell phone, a smart TV, a smart wearable device, or other appropriate electronic device which is capable of displaying the annotation user interface 132.

In an example, annotation user interface 132 is a web application. In other examples, annotation user interface 132 is a device application. In some examples, annotation user interface 132 allows annotating user 134 to interact with the displayed images or other appropriate display means to better interact with annotation tool 144.

Although, in the example shown, a single annotating user 134 is depicted, it is noted that a number of annotating users may be employed within an overall system such as described herein. For example, multiple annotating users may be employed to annotate images, and images may be allocated to annotating users based on the prioritization defined using the prioritization application 118, and based on the number of annotating users available.

In some examples, annotation tool 144 may be a software tool. In some examples, annotation tool 144 provides annotation user interface 132 for display on annotation user device 136. In some examples, annotation tool 144 may receive inputs from annotating user 134, for example: an indication of detected objects, colors, products, or text; annotations to be assigned; an object identifier of an object appearing in an image, alongside a bounding box identifying a location of the object; other metadata to be associated with an image; and/or product curations. In some examples, annotation tool 144 may recognize patterns or indicate whether a particular model of the annotation models 106 and/or context application 104 needs to be re-trained.

In some examples, annotation tool 144 may include product curation. Annotation tool 144 may provide a workflow for annotating images, and in some examples may include automated or semi-automated image annotation task assignment. In some examples, the image annotation task assignment may be based on an assigned image priority, as defined by prioritization application 118. Annotation may include, for example, application of one or more designators identifying a location within an image of an object of interest, as well as application of metadata to the object of interest, e.g., assigning one or more item characteristics to the object. In some examples, application of metadata may include, e.g., a unique identifier of the object of interest, such as a unique product identifier of a product visible within the image to be annotated.

In some examples, consuming user 140 may access annotated images via consuming user interface 138 on user device 142.

In an example, consuming user 140 is an employee, operator, manager, or other agent of the enterprise. In an example, consuming user 140 may be of an enterprise team such as marketing, planogram planning/monitoring, product stocking, development, supply chain, engineering, development, or other user. In some examples, particular consuming users 140 may be given access to all or specific groups of annotated images. In some examples, particular consuming users 140 may receive a notification that a specific image or group of images has been annotated.

In some examples, user device 142 may be a desktop computer, a laptop computer, a tablet, a cell phone, a smart TV, a smart wearable device, or other appropriate electronic device which is capable of displaying the consuming user interface 136.

In an example, consuming user interface 136 is a web application. In other examples, consuming user interface 136 is a device application. In some examples, consuming user interface 136 allows consuming user 140 to interact with the displayed images or other appropriate display means to better utilize the annotated images.

Figure 2:
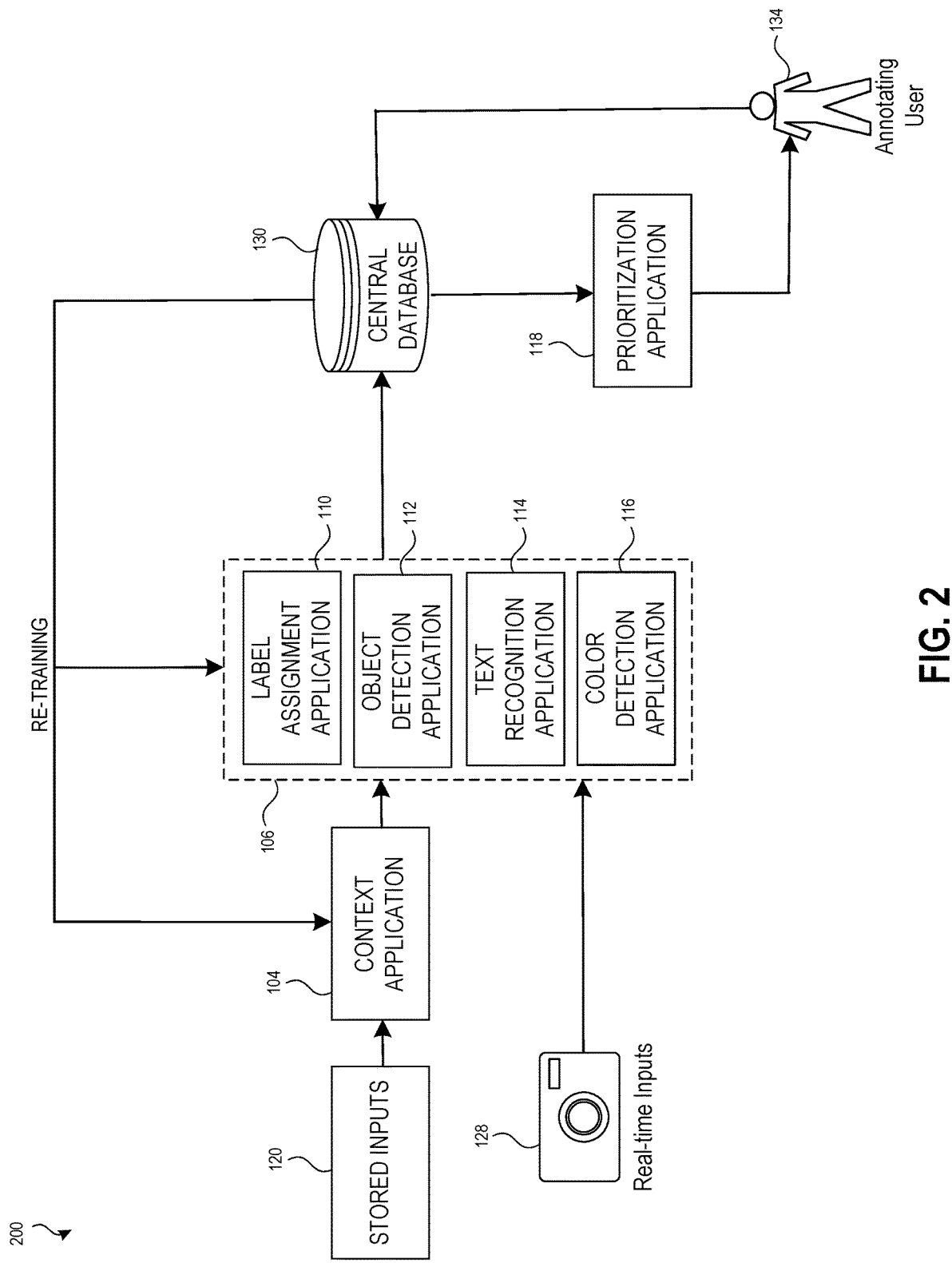
FIG. 2 illustrates an example system for annotating images and prioritizing data for additional annotation, according to an example.

FIG. 2 illustrates an example logical flow 200 of image data within system 100 of FIG. 1, for annotating images and prioritizing data for additional annotation, according to an example. The logical flow 200 corresponds generally to identification of images requiring user annotation based on monitored annotation metrics assessed within the system 100 described above.

In some examples, one or more images which may or may not have associated context may be provided from stored inputs 120 to context application 104. If no context is included with such images, the context application 104 may utilize an image classification model to identify a specific context for the received image. Example contexts for received images, in the context of a retail enterprise, may include a specific store shelf image, a product image within a particular product category (or each product category), an image of customer or worker traffic at a retail location or warehouse, an image of a scene including products used in context, third party customer images received by the retail enterprise, and the like. Each context classification defined by the context application 104 may be mapped to one or more annotation models that may subsequently be employed to annotate the image consistent with the model trained in the specific context (e.g., to identify specific objects or products likely to appear within that context).

Once a context is determined, one or more annotation models 106 may be employed. In some examples, context is determined using the context application 104. Depending on the confidence of the classification, the images and associated context may be provided to two or more such annotation models, to determine an ultimate confidence of annotations from each model to obtain a final context and annotation set for the given image. In other contexts, one or more images which have a pre-associated context may be provided from real-time inputs 128 to annotation models 106 directly.

In some examples, annotation models 106 are context-specific. In some examples, label assignment application 110 will assign general or specific annotations/labels/tags, based at least in part on the context associated with the image. As noted above, a context may correspond to a specific expected viewpoint of one or more images, or one or more expected types of objects that may appear within the images. Alternatively, a context may simply relate to a set of items or item types that are expected to appear within a common image. In some examples, object detection application 112 may identify one or more objects (in some examples, enterprise products may also be identified) in the image, based at least in part on the context associated with the image. In such instances, detection of a particular item within an image at a high confidence, as well as a classification of the image into a context, may assist with detection of other objects or item types appearing within the same image based on a likelihood of common appearance of two items/objects.

In some examples, text recognition application 114 may also identify one or more texts in the image, based at least in part on the context associated with the image. For example, a context may improve accuracy of text detected, since some text may be modeled as being more or less likely to appear in a given context. In some examples, color detection application 116 may identify one or more colors in the image, based at least in part on the context associated with the images.

In some examples, annotations (labels, tags) are assigned to the images by one or more of the annotation models 106. Annotated images may be stored in central database 130. Annotations may include the identified characteristics or contents of each image, as well as an associated confidence in the labeling or annotation that identifies the specific characteristics or contents. Annotations may include labeling an image, or a region of an image, alongside one or more labels attached thereto. The labels attached via the annotation models 106 may include, for example, item identification labels that uniquely identify an item from within a retail item database as appearing in the image.

In some examples, prioritization application 118 determines whether annotated images include acceptable annotations (for example, annotations which are complete and accurate) and which images include unacceptable annotations (for example, missing annotations or annotations which are incomplete and/or inaccurate), based off of enterprise factors. Enterprise factors may include, in some examples, business considerations, safety factors relating to safety of enterprise employees/agents/guests, number of enterprise guests visiting a retail aisle in a given period of time, empty shelves determined, scene/background, accuracy requirements, environmental factors, image clarity/quality, lighting, camera functionality, confidence level of assigned annotations, or others.

In some examples, in addition to determining whether images require further annotation, prioritization application 118 may determine a priority order (also based on the enterprise factors) in which the images should be further annotated. Images requiring further annotation may be assigned to a position in a queue.

In some examples, an annotating user 134 may add additional annotations (or may modify or remove existing annotations) to the images, based on the determinations by prioritization application 118. In some examples, annotating user 134 may add additional annotations to images which are placed in an earlier position in the queue before adding additional a later position in the queue. Images annotated by annotating user 134 may be stored in central database 130.

In some examples images with acceptable annotations (either which were acceptable after being annotated by annotation models 106 or which are acceptable after further annotation by annotating user 134) and are stores in central database 130, may be used to train or re-train context application 104 and any or all of annotation models 106.

Figure 3:
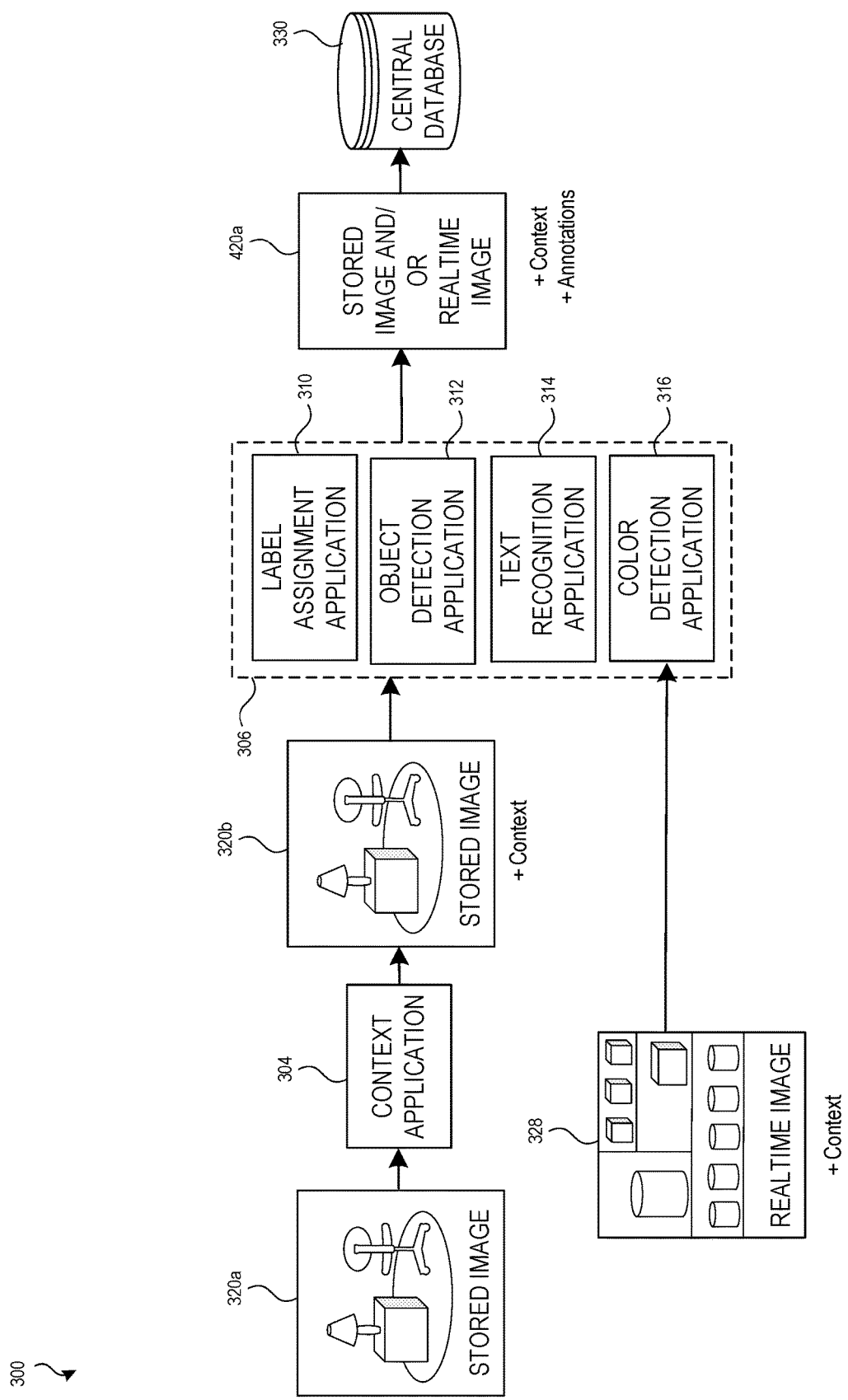
FIG. 3 illustrates an example system for assigning context to images and annotating images, according to an example.

FIG. 3 illustrates an example system for assigning context to images and annotating images, according to an example.

In an example, a stored image 320a (which may be stored in stored inputs 120, refer to FIG. 1), may be received by context application 304. Context application 304 may include a context model configured to assign a context from among a plurality of predefined contexts to the stored image 320a. The context may be, for example, based on a predetermined type of image expected. In the case of curated images of retail items context application 304 may assign a context to stored image 320a of "residential furniture." For purposes of illustration only, a stored image will be discussed herein in the context of residential furniture/rooms. However, this disclosure applies to images relating also to other contexts, including, but not related to, clothing and apparel, toys, sporting goods, produce, food, cosmetics, hygiene products, electronics, refrigerated or frozen goods, or other retail product categories. In still other examples in which a received image lacks context, the image may be categorized as a "store entrance" image, a "retail shelf" image, or the like. In some examples, stored image 320b (which includes the assigned context, for example, as metadata), may be stored in central database 330.

In some examples, stored images 320b may be received by one or more of the annotation models 306. In some examples, stored images 320b may be designated to be received by a selected one or more of the annotation models 306, based on the assigned context.

In examples, the annotation models 306 may be machine learning models of various types which are trained to annotate images based on a determined and assigned context. The annotation models 306 may be organized into contexts, and various applications may utilize models from among the annotation models 306 to perform annotation. In the example shown, a label assignment application 310, an object detection application 312, a text detection application 314, and/or a color detection application 316 may utilize one or more context-specific models for annotation of the stored image 320b.

For example, label assignment application 310 may utilize a plurality of different models from among the annotation models 306, and may be configured to generate labels to be assigned to stored image 320b, based at least on the context assigned to stored image 320b. For example, label assignment application 310 may select a particular model based on a determined context of the image, as assigned by the context application 304. Such labels may include, e.g., labels related to color, category, object or person characteristics, or others. In some examples, label assignment application may provide information about objects or people within an image. In some examples, label assignment application 310 may analyze the image and assign labels before or after object detection application 312, text detection application 314, or color detection application 316.

In some examples, object detection application 312 may detect objects within stored image 320b, using a model selected based at least on the context assigned to stored image 320b. In some examples, specific products may be detected. In some examples, bounding boxes may be placed on the image. In some examples, specific product crops may be generated.

In the particular example shown, object detection application 312 may detect a chair, an end-table, a rug, and a lamp in stored image 320b. However, even though object detection application 312 may utilize a model that is trained to also recognize a lawn chair, a floating pool pad, or a headlamp, it will not consider assigning any of these items to stored image 320b because these items to not fit with the assigned context "residential furniture." In some instances, the model selected by the object detection application 312 is trained to detect only a specific class of items, so may not even recognize/detect items appearing within the stored image 320b which fall outside the determined context.

In some examples, text detection application 314 may detect text within stored image 320b, based at least on the context assigned to stored image 320b. In an example, text detection application 314 may utilize one or more context-specific models to detect text present in the image, such as letters, numbers, symbols, logos, words, or other relevant text. Although text detection application 314 may be trained to recognize many different textual features (e.g., item names of items for sale, product labels, and the like), in some examples, it may not consider assigning any text-related annotations to stored image 320b which do not fit with the assigned context (in this particular example, "residential furniture").

In some examples, text detection application 314 may utilize a multi-step process. First, stored image 320 may be corrected to remove any skew present, to improve text detection by text detection application 314. Individual characters may then be extracted from stored image 320. Words (and phrases) made of character strings may be generated using pre-calculated dictionaries which text detection application 314 has access to. Detected text data may be arranged into a specific format if needed. In some examples, for certain categories of products (for example, "lamps" in this particular illustration), data may be segregated into parts that correspond to one or more different dictionaries (such as "components" relating to materials of construction of segments of the product such as "lampshades," "base," "bulb," etc.; and "other").

In some examples, color detection application 316 may detect and/or recognize color within stored image 320b, based at least on the context assigned to stored image 320b. In the particular example shown, color detection application 316 may detect color present in the image which is associated with objects detected by object detection application 312 (for example, one or more colors associated with the chair), in some examples as define by bounding boxes or identified pixels. Although color detection application 316 may include models trained to recognize many different colors in diverse image content, in some examples, it may not consider assigning any color-related annotations to stored image 320b which do not fit with the assigned context "residential furniture." In this particular example, color detection application 316 may assign a label associated with the chair or rug, but not to the wall in the background of the scene.

In some examples, real-time image 328 may be received by one or more of the applications described above, and annotated using one or more context-specific annotation models 306. In some examples, real-time image 328 may have been captured by a shelf-edge camera in an enterprise retail store (either as an image or as a video still, for example). In some examples, the real-time image 328 may have associated with it a context, which may be associated with the shelf-edge camera. In a particular example, the camera may be positioned to take photographs of an aisle labeled Aisle B in the Food section of a retail store of the enterprise, which contains breakfast products, and so a context associated with the real-time image 328 may be "Food: Aisle B: Breakfast Foods." For purposes of illustration only, a stored image will be discussed herein in the context of foods. However, this disclosure applies to images relating also to other contexts, including, but not related to, clothing and apparel, toys, sporting goods, produce, furniture, cosmetics, hygiene products, electronics, refrigerated or frozen goods, or other retail product categories.

In such a context, the annotations models 306 may include a model specific to that aisle, which can be trained to detect the items appearing on shelves within the aisle. In such an arrangement other models may be used for other aisles, and trained using different training datasets of annotated images. In other examples, a model may be used to detect and label items appearing on shelves across a number of aisles. In examples, images may not need classification, as they are received with tags indicating a location/time of capture, which may allow context to be determined and/or inferred. An example system for capturing and labeling items appearing on shelves at a retail location, including specific models useable to perform such detection and labeling, is described in U.S. patent application Ser. No. 17/681,491, the disclosure of which is hereby incorporated by reference in its entirety.

For example, label assignment application 310 may be configured to generate labels to be assigned to real-time image 328, based at least on real-time image 328, including labels related to color, category, object or person characteristics, or others. In some examples, label assignment application may provide contextual information about objects or people within an image. In some examples, label assignment application 310 may analyze the image and assign labels before or after object detection application 312, text detection application 314, or color detection application 316.

In some examples, object detection application 312 may detect objects within real-time image 328, based at least on the context assigned to real-time image 328. In the particular example shown, object detection application 312 may select and apply a context-specific model to detect various boxes or other containers of retail products in real-time image 328. In some examples, object detection application 312 may, through its own training or via reference to a retail store planogram, identify specific products of the image (for example, a certain brand and type of cereal or instant oatmeal). In some examples, object detection location may identify an empty display location of the image, for example, a position on a display (shelf, table, etc.) where a product (a specific product or a product generally, in some examples) should be, but is missing or out of stock. However, even though object detection application 312 may be trained to also recognize a box of sodas, a cylinder of tennis balls, or a box of adhesive bandages, it will not consider assigning any of these items to real-time image 328 in this particular example because these items to not fit with the assigned context "Food: Aisle B: Breakfast Foods."

In some examples, object detection application 312 may place bounding boxes around identified objects (or identified empty display locations), which may designate specific pixels of the image which make up the object. In some examples, object detection application 312 may identify specific products sold by the enterprise (for example, a specific manufacture and model of chair, or a specific brand and type of cereal box). In some examples, specific product crops may be generated.

In some examples, text detection application 314 may detect text within real-time image 320b, based at least on the context assigned to real-time image 328. In an example, text detection application 314 may detect text present in the image, such as letters, numbers, symbols, logos, words, or other relevant text. Although text detection application 314 may be trained to recognize many different textual features, in some examples, it may not consider assigning any text-related annotations to stored image 320b which do not fit with the assigned context (in this particular example, "Food: Aisle B: Breakfast Foods").

In some examples, text detection application 314 may utilize a multi-step process to identify and assign text labels to real-time image 320b, similar to that described above for stored image 320a.

In some examples, color detection application 316 may detect and/or recognize color within real-time image 328, based at least on the context assigned to real-time image 328. In the particular example shown, color detection application 316 may detect color present in the image which is associated with objects detected by object detection application 312 (for example, one or more colors associated with the chair), in some examples as define by bounding boxes or identified pixels. Although color detection application 316 may be trained to recognize many different colors in diverse image content, in some examples, it may not consider assigning any color-related annotations to real-time image 328 which do not fit with the assigned context "Food: Aisle B: Breakfast Foods." In this particular example, color detection application 316 may assign a label associated with the chair or rug, but not to the wall in the background of the scene.

In some examples, once one or more of annotation models 306 have assigned annotations/tags/labels to real-time image 328 and/or stored image 320b, the resulting annotated image 420a may be stored in central database 330. In some examples, annotated image 420a is stored in central database 330 along with its assigned context, annotations, and/or other relevant data or metadata.

In another particular example (not shown), the above descriptions may apply to real-time images captured by an image source that faces a loading dock, road, or parking space. Annotation may include (in addition to those listed above and more) vehicles, people, equipment, whether protective equipment is being worn, whether safety precautions are being taken, and others.

Figure 4:
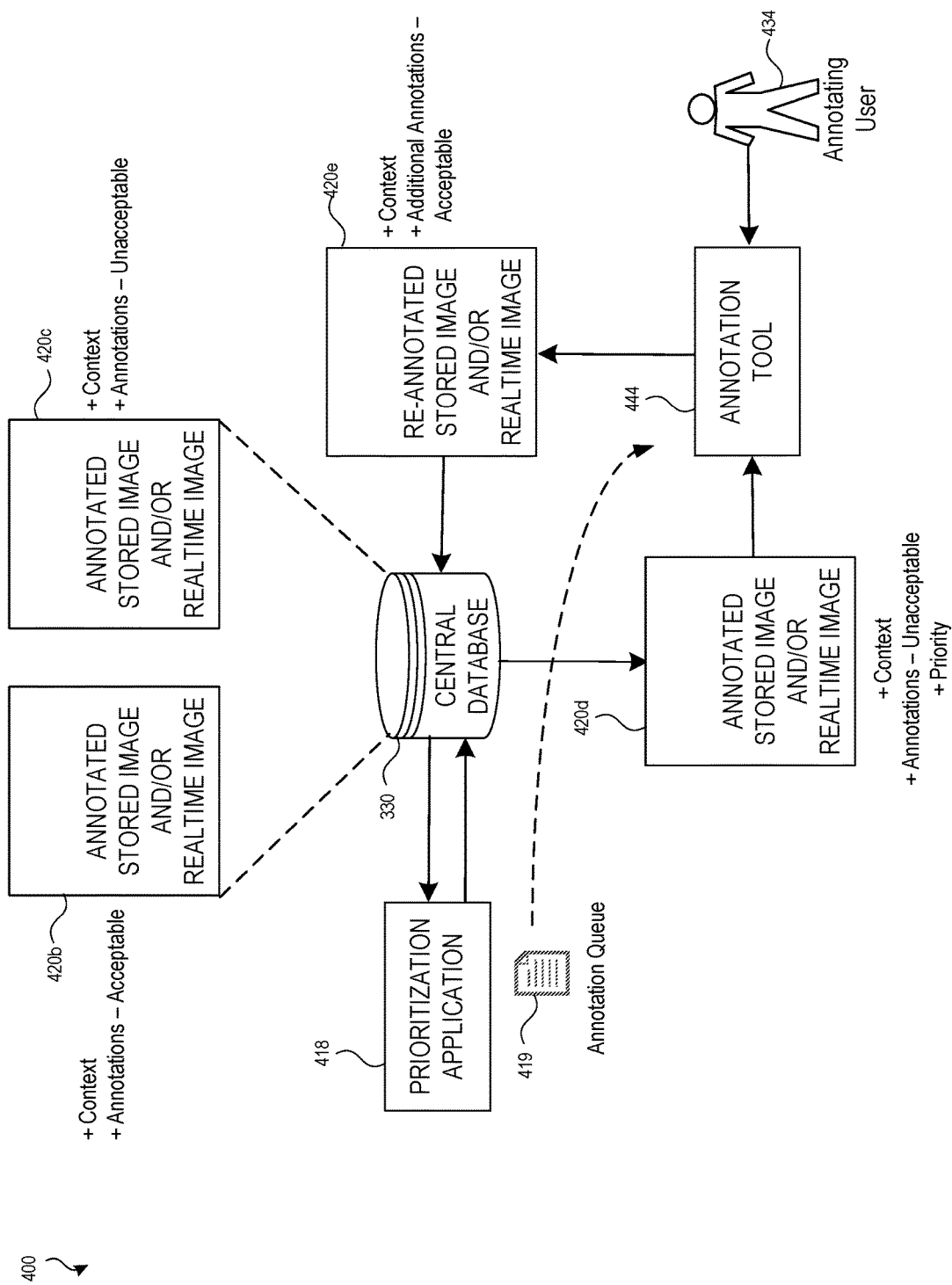
FIG. 4 illustrates an example system for prioritizing data for additional annotation, according to an example.

FIG. 4 illustrates an example system for prioritizing data for additional annotation, according to an example.

In some examples, central database 330 includes one or more annotated images 420a (refer to FIG. 3). These annotated images may include an assigned context and one or more assigned annotations. The annotations may be of unknown quality and/or unknown completeness. Some images, represented by annotated image 420b, may have acceptable annotations (acceptable quality or completeness). Some images, represented by annotated image 420c, may have unacceptable annotations (unacceptable quality, low confidence, or incomplete/missing).

In some examples, prioritization application 418 may evaluate each of images and determine which include acceptable annotations (annotated image 420b) and which include unacceptable annotations (annotated image 420c). In some examples, this determination by prioritization application 418 may be based on one or more enterprise factors (e.g. business rules). These enterprise factors may include, but are not limited to: business considerations, safety factors relating to safety of enterprise employees/agents/guests, number of enterprise guests visiting a retail aisle in a given period of time, empty shelves determined, scene/background, accuracy requirements, environmental factors, image clarity/quality, lighting, camera functionality, confidence level of annotations, or others.

In some examples, prioritization application 418 may prioritize removal of labels. For example, if one or more of annotation models 306 spend computing resources analyzing and labeling a wall and characteristics of a wall in the background of an image, where the context of the image is "residential furniture," then computing power and resources may be wasted because the characteristics of the wall are unimportant to the enterprise and unrelated to the context. Prioritization of removal of an assigned annotation may lead to manual removal of an annotation (as described below) and also may lead to re-training (also as described below) of one or more of annotation models 306 using images which have had these annotations removed to increase the efficiency of the annotation models 306.

In some examples, prioritization application 418 prioritizes images based on context. That is, when one image, or a series of images, is determined to be associated with unacceptable annotations, it is inferred that a particular one or more annotation models is not appropriately identifying attributes of that image. Accordingly, depending on not only business rules, but also the extent of inaccuracy, the specific model may be prioritized for retraining. As such, the unacceptably annotated images may be placed in a queue of images for prioritized manual annotation via annotation tool 444, and subsequently used for retraining, as discussed further below.

In some examples, real-time images (for example, shelf-edge images or images of loading docks) may be prioritized before stored images, based on enterprise factors. For example, an image from a loading dock may receive high priority as it may be important for the enterprise to ensure safety of personnel in the loading area. For example, an image from a shelf-edge camera may receive a high priority to ensure that empty shelves are accurately determined so that they may be timely re-stocked and that items remain available for customers to purchase.

In some examples, prioritization application 418 may receive inputs including and relating to the enterprise factors from other enterprise applications and/or application users.

In some examples, prioritization application 418 may detect and prioritize images from an image source (for example, a camera) with an operational issue (for example, distorted images, lens problem, cloudy image, etc.). In such an example, images from that source within a time range may be assigned a higher priority.

In some examples, prioritization application 418 may determine a prioritization based on accuracy of assigned annotations. Prioritization application 418 may perform a batch processing of images across a category or context to assess overall accuracy of images annotated with a given one or more models. Accuracy may be calculated based on, e.g., an overall confidence of annotations within an image, or changes in confidence over time (which may reflect, for example, changes in appearance of an item such as a change in product packaging or the like). Such batch processing may involve retrieving all images which correspond to a particular context or category, and calculating an accuracy based off of those images. In some examples, the batch processing may be done on a periodic basis for images within the given period to ensure accurate model training (for example, every day/week/year). In examples, the frequency of reassessment of images may vary based on context and the volume of images obtained for a given model and context.

In some examples, annotated images 420c which are determined to have unacceptable annotations are prioritized (for example, assigned a priority) for further annotation. Prioritization application 418 may prioritize images that lack complete labels. In a particular example, where 420c is an annotated real-time image 328, prioritization application 418 may reference an enterprise factor which indicates that Aisle B has a high amount of guest traffic. If prioritization application 418 determines that object (for example, product) identification is low for annotated image 420c, the prioritization application 418 may assign annotated image 420c a high priority for additional annotation. In a particular example, where 420c is an annotated real-time image 328, and has been assigned an annotation of a specific product but at a confidence level below a predefined confidence level threshold, the prioritization application 418 may assign annotated image 420c a high priority for additional annotation.

In addition, in some examples, prioritization application 418 may, based on a determination of priority for an image, make a determination of priority for one or more other images from the same source, to ultimately improve image annotations associated with that source. In the particular example described in the previous paragraph, prioritization application 418 may also flag other annotated images stored within central database 330 which originated from the same camera as real-time image 328 as high priority for additional annotation to increase product identification for that particular camera monitoring Aisle B.

In some examples, prioritization application 418 may prioritize images that lack accurate labels. In some examples, annotated images may not have a quality (for example, clear and unobscured) view of an object or of background objects (or text, color, etc.), which may interfere with identification and labeling the object (or text, color, etc.). In some examples, these images may be identified by prioritization model 418 and prioritized for additional annotation.

In some examples, annotated images 420c prioritized by prioritization application 418 for additional annotation (represented by annotated image 420d) may be assigned a position in a queue 419 for additional annotation, whereby annotated images 420c with a higher priority and therefore earlier position in the queue may receive additional annotations earlier than images with a lower priority.

In some examples, annotated image 420d may receive additional annotations generated by annotating user 434. Annotating user 434 may utilize annotation tool 444 to view and annotate/label/tag annotated image 420d. Annotating user 434 may add one or more additional annotations, modify one or more existing annotations, verify one or more existing annotations, or remove one or more existing annotations. In some examples, annotating user 434 may provide product curations/identifications for retail products sold by the enterprise.

In some examples, the re-annotated image 420e which now includes an assigned context and acceptable annotations may be stored in central database 330.

In examples, the queue 419 includes a list of image identifiers for images stored in central database 330 to be annotated. The queue 419 may also maintain a status of those images as needing annotation or for which annotation is completed (e.g., as updated by annotation tool 444). Alternatively, a re-annotation status of an image may be maintained in metadata associated with the image, and stored in the central database 330. Such metadata or updates to an annotation queue 419 may be monitored and used for retraining one or more classification and/or context-specific models, as described below.

Figure 5:
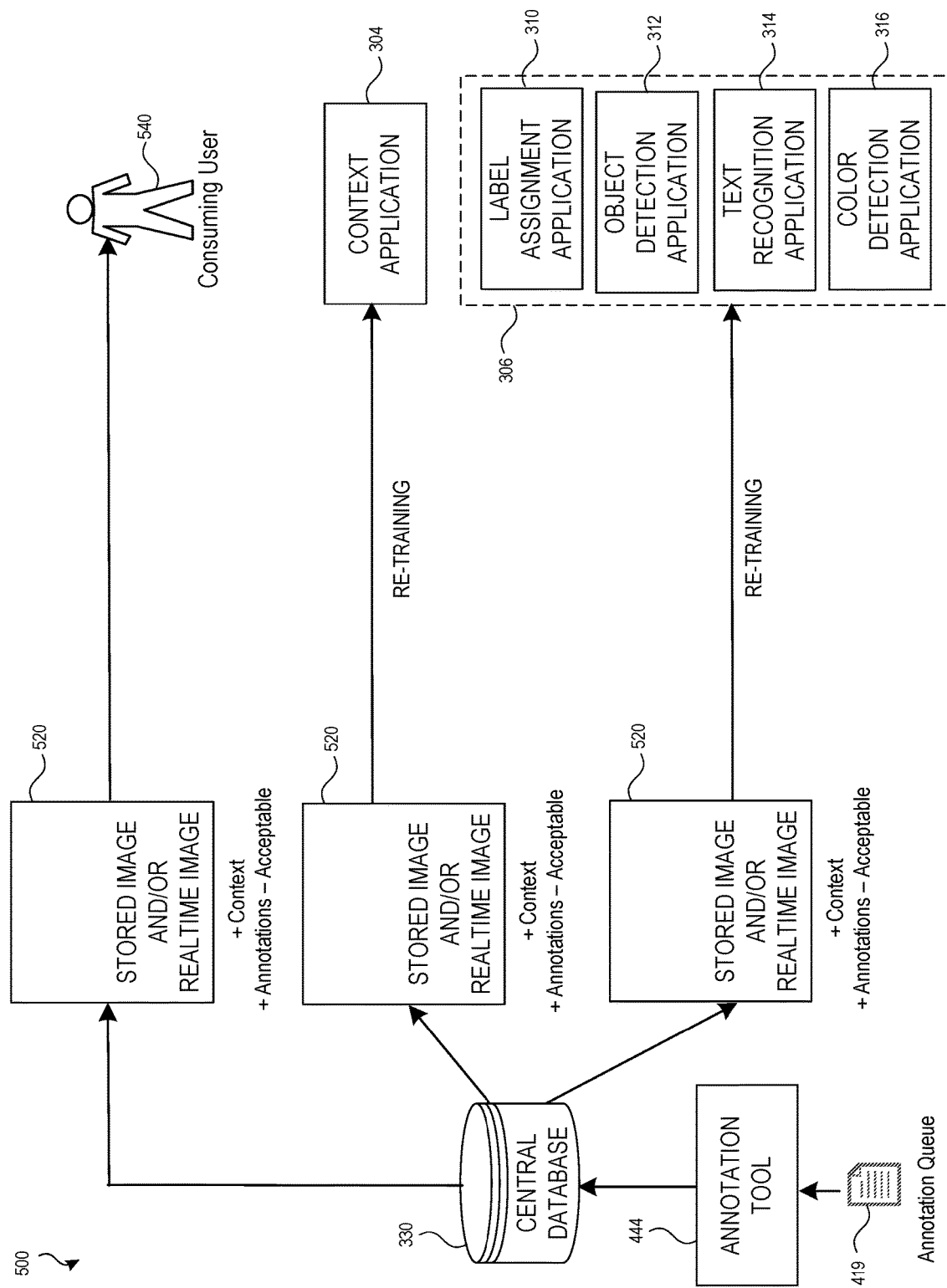
FIG. 5 illustrates an example system for providing annotated images to a user, and for re-training context and annotation models, according to an example.

FIG. 5 illustrates an example system for providing annotated images for re-training context and annotation models, according to an example.

In some examples, stored image 520, which may be stored in central database 330, is available to consuming user 540. In some examples, stored image 520 may represent annotated image 420b (which acquired acceptable annotations via annotation models 106, 306) or re-annotated image 420e (which acquired acceptable annotations via annotation models 106, 306 and annotation tool 444). Consuming user 540 may utilize the stored image 520 for a multitude of purposes, including: in advertising and marketing campaigns; to attract new customers and retain or increase the patronage of new customers; to analyze product shelf placement; train or build machine learning models; detect safety hazards in brick-and-mortar retail stores warehouses, mixing centers, parking lots, or other physical areas; to identify store or retail display stock levels; to perform other necessary enterprise tasks. In one example, consuming user 540 may utilize one or more downstream applications to analyze the annotated image, and detect conditions associated with the image. This is particularly the case for real-time images, for example images of shelf stock. In examples, the consuming user 540 may utilize a downstream application used to detect out of stock events, for example as described in U.S. patent application Ser. Nos. 17/681,507 and 17/681,470, the disclosures of each of which are hereby incorporated by reference in their entireties.

In some examples, consuming user 540 may need to find images relevant to a particular product or other category for their use. Consuming user 540 may rely, in some examples, on image annotations/labels/tags so that they can identify and gather relevant images. Accurate and complete annotations/labels/tags may make this identification and gathering more efficient for the consuming user 540.

In some examples, stored image 520 may also be accessible (from central database 330) for re-training context application 304. Stored image 520 may also be accessible (from central database 330) for re-training any of annotation models 106. Because stored image 520 includes acceptable annotations which were either determined to be acceptable by prioritization application 418 or confirmed/added/edited by annotating user 434, they can be fed back to one or more of the annotation models 106 and used to train the machine learning/artificial intelligence models.

In some examples, this re-training may be done when a drift in annotation quality/acceptability is noticed, or a drift in accuracy of context classification is detected. In examples, prioritization application 418 may be used to determine not only that a particular model should be retrained, but may monitor for manually annotated images obtained from the annotation tool 444 to determine when sufficient images are received to perform a retraining process. Specific models may each have a threshold number of images to be used for retraining, which may include both manually annotated images and automatically annotated images from among those which have acceptable annotations (e.g., both annotated image 420b and re-annotated image 420e). For example, if text recognition application 314 is consistently missing annotations, assigning incorrect annotations, or assigning annotations with low confidence, one or more text recognition models used by text recognition application 314 may be re-trained with a subset of stored images 520 that are applicable to text recognition annotations, and specific to a particular context of that model).

In some examples, when the accuracy/detection of a particular type of object or particular product is lower than desired. For example, "lamps" within a particular context (e.g., "furniture") may not being detected at a rate above a particular accuracy threshold, for example based on a manual audit of images, based on, e.g., an assessment of image recognition confidence, or based on feedback at the time of image capture. In such cases, one or more models of annotation models 106 may be re-trained using a subset of stored images 520 that include accurate annotations of "lamp" within that context.

In some examples, re-training may be done as needed (as described above), or on a more regular basis, e.g., periodically (for example, every month, every two weeks, etc.). In some examples, this re-training may be done automatically. In some examples, this re-training may be initiated by a user (for example, an enterprise user).

Re-training of the models may allow for the models to more accurately and/or more completely annotate images. Images which have more accurate/complete annotations may contribute to better use of the images and annotations by consuming users, and may be more easily located by text searching and/or reverse product searching to make identification and gathering of relevant images by the consuming user more efficient.

In some examples, text searching may include a search for a particular query text or related text within the text of attributes assigned to one or more images. In some examples, reverse image searching may include a search for one or more images which are similar to a query image (which may have attributes assigned to it), by detecting similar attributes.

Figure 6:
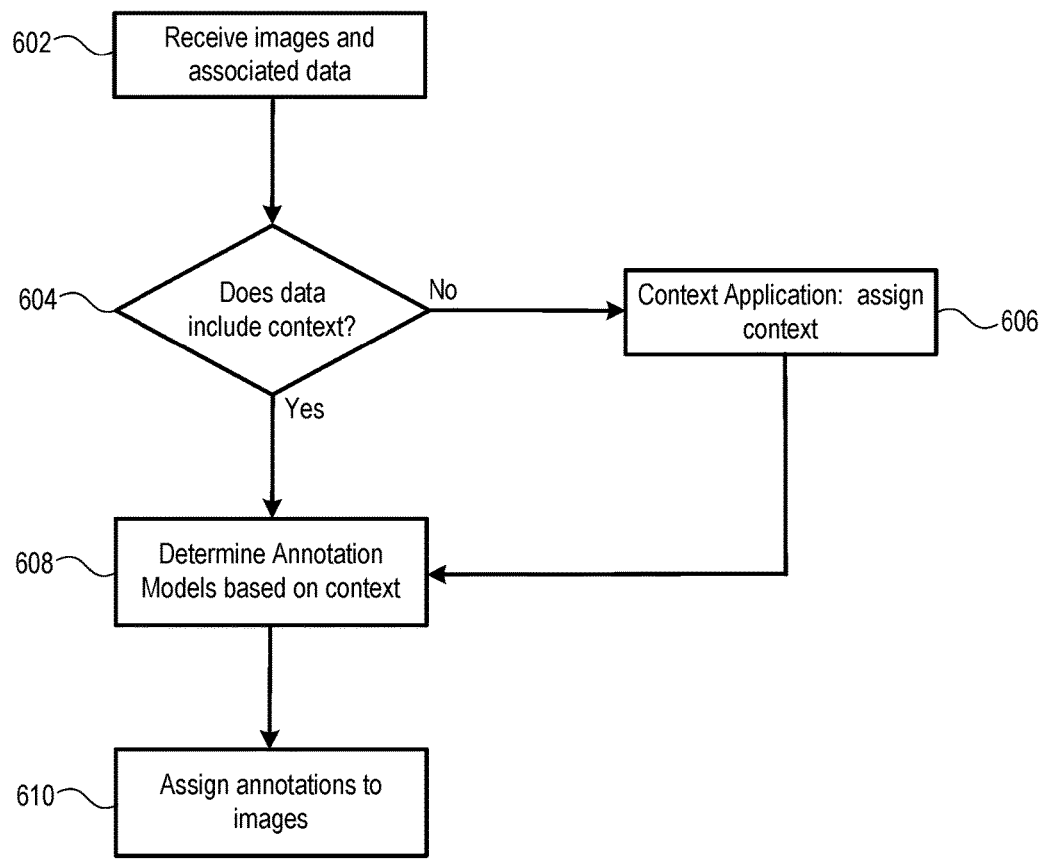
FIG. 6 illustrates an example process for assigning context to images and annotating images, according to an example.

FIG. 6 illustrates an example process for assigning context to images and annotating images, according to an example. The process 600 may be performed by, for example, a context application using a classification model, such as the context application 104 described above as being included within the system 100 shown and described with respect to at least FIG. 1-FIG. 3.

At operation 602, media content, including images and associated data, may be received. Associated data may include context and/or other (meta)data, including source, time, date, location, type, or others.

At operation 604, a determination is made whether or not the received image includes a context. An image may include a context based, at least in part, on metadata associated with the image. Such metadata may include labels regarding a time and place at which the image was captured, or may include information about a particular scene as applied automatically or by a user at the time of capture. If the image has a context, it is then considered able to be annotated by a context-specific annotation model. The image may then be scheduled for assessment by one or more annotation applications using associated context-specific annotation models as described above.

If the image does not have a context (or, where the context does not correspond directly to one of the predetermined contexts associated with models within the system 100), the image is received by a context application at operation 606 and a context is determined and assigned to the image. That is, the context application determines whether any context information associated with the image when received (e.g., metadata defining when/where an image was taken, or identifying expected content in the image) associates the image to a predefined context. If no predefined context corresponds to any of the context information that may or may not be present with the image, the context application may perform an image analysis and classification operation on the image to identify a context, and associated models trained to annotate images within that predefined context. Once the image has an assigned context, it is received by one or more annotation applications (using appropriate context-specific model(s)).

At operation 608, an image and any context associated therewith are received by one or more annotation applications, which apply one or more context-specific models, based on the assigned context to automatically annotate the image(s). At operation 610, the one or more annotation applications (and associated, context-specific models) may recognize text, objects/products, and/or colors from the image, based at least in part on the context assigned to the image. Labels/annotations/tags may be assigned to the image based on the recognized text, objects/products, and/or colors.

Figure 7:
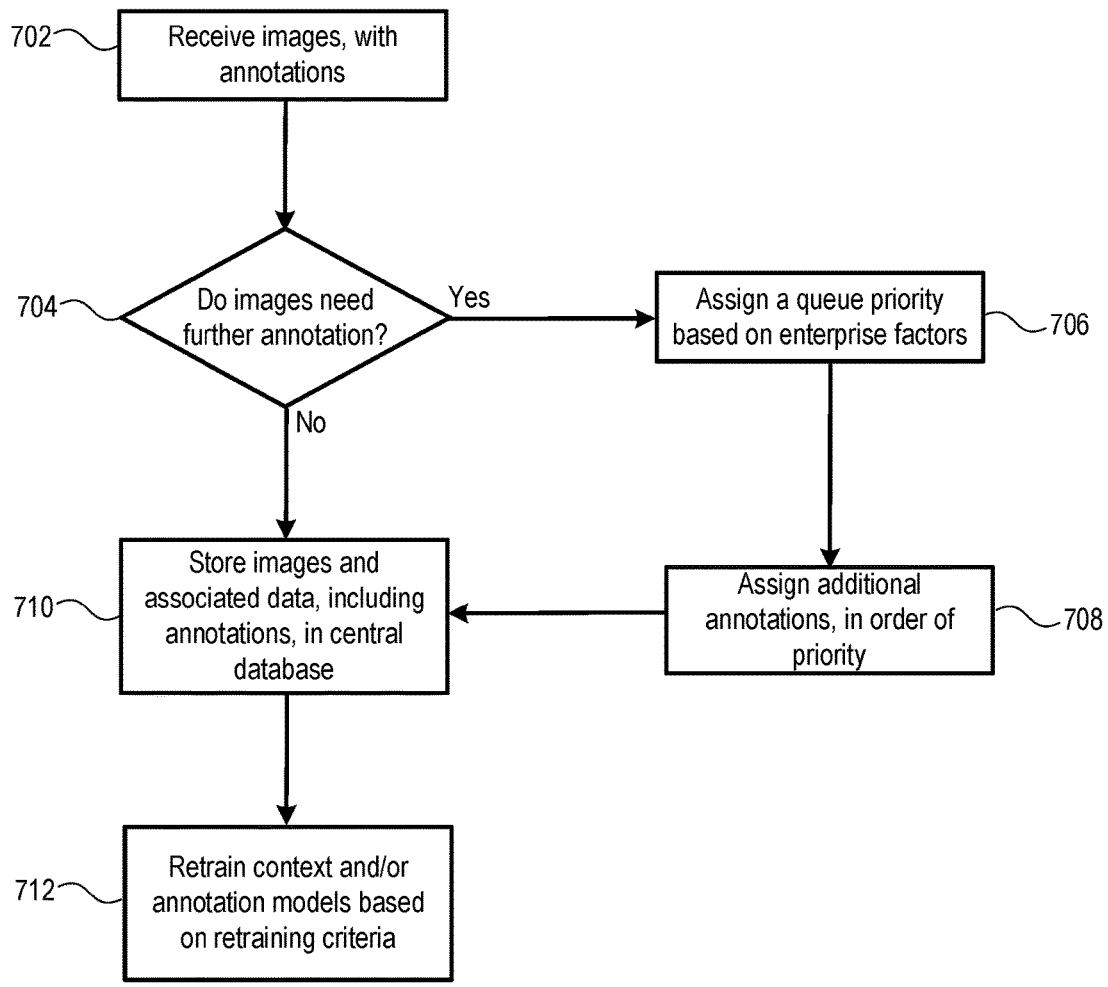
FIG. 7 illustrates an example system for prioritizing data for additional annotation, according to an example.

FIG. 7 illustrates an example process for prioritizing data for additional annotation, according to an example. The process 700 may be performed by one or more systems of the system 100 shown and described with respect to at least FIG. 1-FIG. 2 and FIG. 4-FIG. 5.

At operation 702, media content, including an image including annotations is received, for example, at a prioritization application.

At 704, the prioritization application may determine whether the images require further annotation (for example, if the annotations are incomplete, are of a low confidence, and/or of poor quality/inaccurate). If the images do not require further annotation (the annotations are acceptable), the image may be ready for storage. However, if the images require further annotation (the annotations are unacceptable), the image may be assigned a priority and/or a place in a queue (e.g., queue 419) for re-annotation, at operation 706. The priority and/or place in the queue may be assigned based on one or more enterprise factors.

The images requiring further annotation may be assigned additional annotations, in some examples by an annotating user via an annotation application, at operation 708. The additional annotations (which may include addition of new annotations or removal, modification, or verification of existing annotations) may be assigned to images in order of the priority (for example, the order designated by an image's position in the queue). Once additional annotations have been added, the image will have acceptable annotations and may be ready for storage. At operation 710, images with acceptable annotations may be stored in a central database, along with the contexts, assigned annotations, and other (meta)data associated with the images.

At operation 712, context applications (models) and/or annotation applications (models) may be re-trained. This re-training may utilize the stored images and their associated context and acceptable annotations, accessible from the central database. In some examples, the re-training may be based on retraining criteria. As noted above, re-training criteria may include, for example, confidence or accuracy of annotations falling below a predetermined threshold, or degrading toward a predetermined threshold (trending). Additional re-training criteria may include an amount of time since a last re-training process.

FIG. 8 illustrates an example method for annotating images and prioritizing data for additional annotation, according to an example. The method 800 may be performed by one or more systems of the system 100 shown and described with respect to at least FIG. 1.

Method 800 begins at step 802 with a label classification system receiving input media content data, including input image data. In some examples, the received input image data may include at least one image, where the at least one image a context category associated with it. In some examples, the context category may be associated with a source of the image (for example, a particular camera that took the image. In some examples, the context category may be associated with the content of the image (for example, living room, clothing, an aisle in a particular retail store, etc.).

In some examples, the input media content, including the input image data, is received from a real-time input source. In some examples, the image is of a plurality of retail products captured at a retail enterprise location (for example, store shelves, tables, or racks displaying products for sale). In some examples, the context category of the image is associated with the real-time input source (for example, may indicate a location of a shelf and/or a category of products).

In some examples, the image is received from one or more stored input databases. In some examples, the image is of one of several types, including but not limited to an original image (for example, captured by a still camera), a video still image, or a two-dimensional thumbnail image of a three-dimensional model.

In some examples, where an image does not have an assigned/associated context when received, it may be received at a context application. The context application may determine (and assign to the image) a context category for the at least one image. In some examples, images and associated contexts and other associated data may be stored in a stored input database. In some examples, the label classification system may receive the image and assigned context from the context application.

In some examples, the context application includes a classification model. In some examples, the annotation models (which may be context-specific) include image recognition models (for example, to detect text, color, or objects, etc.) which are trained using training data associated with a specific context.

In some examples, input image data may be received from the real-time inputs source and from the context application.

In some examples, at step 804, based at least in part on the context category associated with (assigned to) the at least one image, one or more annotations/labels/tags are assigned to the image. In some examples, annotations may be assigned to the image by one or more annotation models. In some examples, each annotation model may be context-specific. In some examples, a determination/choice of which annotation model or models (which may be context-specific) may review and annotate an image may be based on the context (for example, a context category) of the image.

In some examples, the annotation applications/models may be configured to detect and assign annotations of types including labels, object recognition, text recognition, color, and/or other appropriate annotations.

In some examples, text recognition may include a multi-step process. First, an image may be corrected to remove any skew present, to improve text detection by the model. Characters may then be extracted from the image. Meaning words made of character strings may be generated using pre-calculated dictionaries which the model has access to. Data may be arranged into a specific format if needed. In some examples, for certain categories of products, data may be segregated into parts that correspond to one or more different dictionaries.

In some examples, one or more of the annotation applications, or associated context-specific models may be configured to determine and provide a confidence level associated with an annotation they assign.

In some examples, at step 806, it is determined whether the at least one image requires additional annotation. In some examples, this determination may be made by a prioritization application. In some examples, an image may require additional annotation if it has unacceptable annotations (for example, incomplete, missing, or inaccurate annotations). In some examples, this determination may be based at least in part on one or more enterprise factors.

In some examples, the prioritization platform/application may be operational on the same computer system as the one or more annotation platform (which may include the one or more annotation models). In some examples, the prioritization platform/application may be operational on a different computer system than the annotation platform, which is communicatively connected to the computer system of the annotation platform.

In some examples, at step 808, if the image does not require additional annotation (for example, its assigned annotations are of acceptable completeness and accuracy/quality), the image may be stored along with its assigned annotations in a central database. In some examples, the central database is accessible to a plurality of enterprise users. In some examples, at least some of the enterprise users may be consuming users.

In some examples, at step 810, if the image requires additional annotation, a priority for additional annotation may be assigned to the image. In some examples, this determination may be made by a prioritization application. In some examples, this determination may be based (at least in part) on one or more enterprise factors. In some examples, the priority may include a position in a queue of a plurality of images which each require additional annotation.

In some examples, the enterprise factors may be related to safety factors, business considerations, number of guests visiting a store aisle, emptiness of store shelves, background of an image, accuracy, quality of image, lighting quality, functionality of a camera, a user-defined prioritization of a designated image source, confidence level of annotations, or other factors relevant to the enterprise.

In some examples, business considerations may include factors determined by complex algorithms, price forecasting, guest/consumer forecasting, and/or product demand or sale forecasting.

In some examples, one or more additional annotations may be assigned to the at least one image. In some examples, the additional annotations may be done according to the assigned priority (and/or assigned position in a queue) so that images with a higher priority (earlier queue position) receive additional annotations sooner. In this context, assigning additional annotations may include adding new annotations to an image or removing, modifying, or verifying existing annotations of an image. In some examples, additional annotation may be received from an annotating user, who may assign the additional annotations via an annotation application.

In some examples, a quality (for example, accuracy, completeness, or number) of assigned annotations (in some examples, annotations assigned by an annotation model, by an annotating user, or both) may be observed and/or monitored. In some examples, if or when a change in the quality of the assigned annotations is detected, at least one of the one or more enterprise factors may be altered based, at least in part, on the detected change in the quality of assigned annotations. In some examples, the alteration of the enterprise factor is done automatically.

In some examples, the image may be stored along with its assigned annotations (including additional annotations) in a central database. In some examples, the central database is accessible to a plurality of enterprise users. In some examples, at least some of the enterprise users may be consuming users.

In some examples, annotation success trend may be automatically observed. Based on this observation, it may be determined whether a context application or a context-specific annotation model needs to be retrained. In some examples, the context application or the context-specific annotation model may be retrained, using the annotated image (in some examples, a plurality of annotated images) and its assigned annotations and additional annotations.

Figure 9:
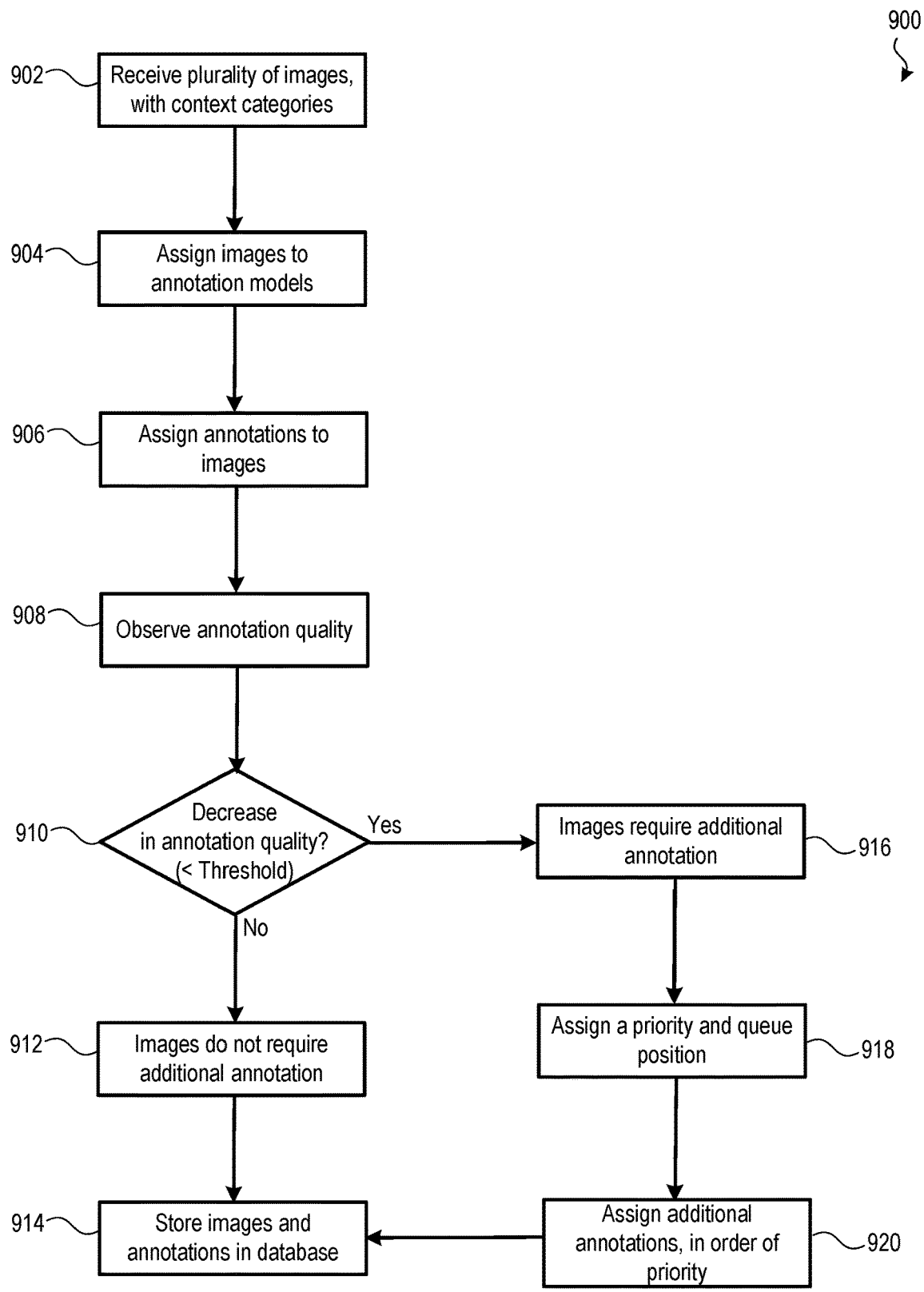
FIG. 9 illustrates an example process for annotating images from a real-time inputs source and determining if images require additional annotations, according to an example.

FIG. 9 illustrates an example process for annotating images from a real-time inputs source and determining if images require additional annotations, according to an example. The process 900 may be performed by one or more systems of the system 100 shown and described with respect to at least FIG. 1-FIG. 4.

In some examples, a retail enterprise may operate one or more brick-and-mortar retail stores, which sell products to consumers. These products may be displayed for sale on various display types, such as shelves, racks, bins, floor displays, hanging, pegs, or others. In some examples, one or more cameras (for example, shelf-edge cameras) may be positioned within a store to capture original images and/or videos (and video stills may be able to be taken from videos) of the store displays. In some examples, the cameras may be as represented by real-time inputs 128 of FIG. 1-FIG. 2. The images captured by these cameras may capture what a given display looks like at a particular point in time and may allow enterprise users to visualize which products are on a given display, if the display is in disarray, if any products are out of stock on a display, or other visuals. A particular example of an image originating from a camera can be described as real-time image 328 in FIG. 3.

In some examples, these cameras may operate as a real-time image source for one or more computer systems, including an annotation platform. In some examples, an annotation platform may be included in a label classification system.

At operation 902, an annotation platform may receive input media content data, including image data, from a real-time inputs source (for example, a shelf-edge camera within a retail store). In some examples, the image data may include a plurality of images. In some examples, the images have data/metadata associated with them, which may include, or may implicate, a context category. In some examples, the context category may be associated with the real-time inputs source, with one or more input sources being associated with a particular, predefined context category. For example, a context category may relate to a particular store, aisle, display, and/or product associated with a camera that captured the image.

In some examples, the annotation platform may include one or more annotation models. The annotation models may be machine learning/artificial intelligence models configured to identify features in an image and assign labels/annotations/tags to the image based on the identified/detected features. In some examples, annotation models may identify features such as color, objects (for example, products for sale by the enterprise), and/or text. In some examples, annotation models may be context-specific.

In some examples, annotation models may be trained using annotated images (in some examples, a plurality of annotated images) and their assigned annotations. In some examples, the annotation models may be trained using annotated images which are assigned a known context.

At operation 904, each image received may be assigned to at least one annotation model. In some examples, the assignment of each image to an annotation model(s) may be based on the context category associated with each image. In some examples, annotation model(s) may be as those described as annotation models 106, 306 of FIG. 1-FIG. 3 and FIG. 5.

At operation 906, each annotation model may automatically assign one or more annotations to each of the received images. In some examples, the assignment of annotations may be based on the context category for each image. For example, although an annotation model may be trained to also detect object relating to sportswear, if the context category indicates that an image relates to an aisle containing breakfast foods, the annotation model will only assign annotations relating to breakfast foods.

At operation 908, a quality of the assigned annotations is observed and monitored. In some examples, a change in quality (including accuracy, completeness, or other relative quality terms) may be observed with respect to images that are included within a particular context category, images that originated from a particular source (for example, a particular camera), or images annotated by a particular annotation model.

A prioritization application (for example, prioritization application 118, 418 of FIG. 1, 2 and FIG. 4) may determine whether each received image requires additional annotation. In some examples, this determination may be based, at least in part, on the observed quality of the one or more annotations that were assigned to each image. In some examples, this determination may be based, at least in part, on one or more enterprise factors.

At operation 910, it may be observed whether the quality of the annotations increases, decreases, or remains unchanged.

If the quality of the annotations is observed to increase or remain unchanged for a subset of images (one or more), at operation 912 prioritization application may determine that the images do not require additional annotation. At operation 914, these images with annotations of acceptable quality may be stored in a database (for example central database 130, 330 of FIG. 1-FIG. 5), which may be accessible to enterprise users and/or consuming users in some examples.

If the quality of the annotations is observed to decrease for a subset of images (one or more), at operation 916 prioritization application may determine that the images require additional annotation. For example, if it is observed for a subset of images that the accuracy of object or product identification is decreasing for images from a particular real-time input source (e.g. a particular camera), prioritization application may determine that images received from that source should received additional annotation.

At operation 918, prioritization application may assign a priority to each image requiring additional annotations. In some examples, the assignment of priority may be based, at least in part, on the observed decrease in quality of annotations. In some examples, the assignment of priority may be based on one or more enterprise factors. In some examples, the enterprise factors may include safety factors, number of guests visiting a store aisle, emptiness of store shelves, background of an image, accuracy, quality of image, lighting quality, functionality of a camera, confidence level of annotations, and/or a user-defined prioritization of a designated image source.

In some examples, the priority assignment may include or may lead to an assigned position in a queue for the image, where the position in the queue defines an order in which the images will be assigned their additional annotations. For example, images that have assigned annotations which have a worse observed quality may receive a higher priority and earlier queue position so that they may be annotated sooner than images which have assigned annotations with a decrease in observed quality that is less severe.

At operation 920, additional annotations may be assigned to the images according to the order defined by the priority and queue positions. In some examples, the additional annotations may include removing existing annotations, adding new annotations, or verifying existing annotations. In some examples, assigning additional annotations may be done by an enterprise user via an annotation tool. For example, an enterprise user may remove annotations relating to incorrect object annotations, may verify existing annotations, and/or may add object annotations where the annotation model failed to detect/annotate them.

At operation 914, these images with verified and additional annotations may be stored in a database, which may be accessible to enterprise users and/or consuming users in some examples.

In some examples, in response to observing the decrease in quality of the annotations of the subset images (which are determined to require additional annotation), it may be determined that at least one of the one or more annotation models needs to be retrained, based on the observed decrease in quality. The identified annotation model(s) may be retrained using images stored in the database which have acceptable annotations. This may include images which received additional annotations and/or images which were determined not to need additional annotations. Referring to the example described above, it may be determined that an object annotation model should be retrained because the quality of annotations relating to objects/products was observed to decrease. This model may be retrained using either (or both) images which were determined to have adequate quality annotations from the model, or images which received additional (and potentially removed or verified) annotations from an annotating user (which may have corrected errors made by the annotating model).

In some examples, at least one of the one or more enterprise factors may be automatically altered based, at least in part, on the observed quality of the annotations.

Figure 10:
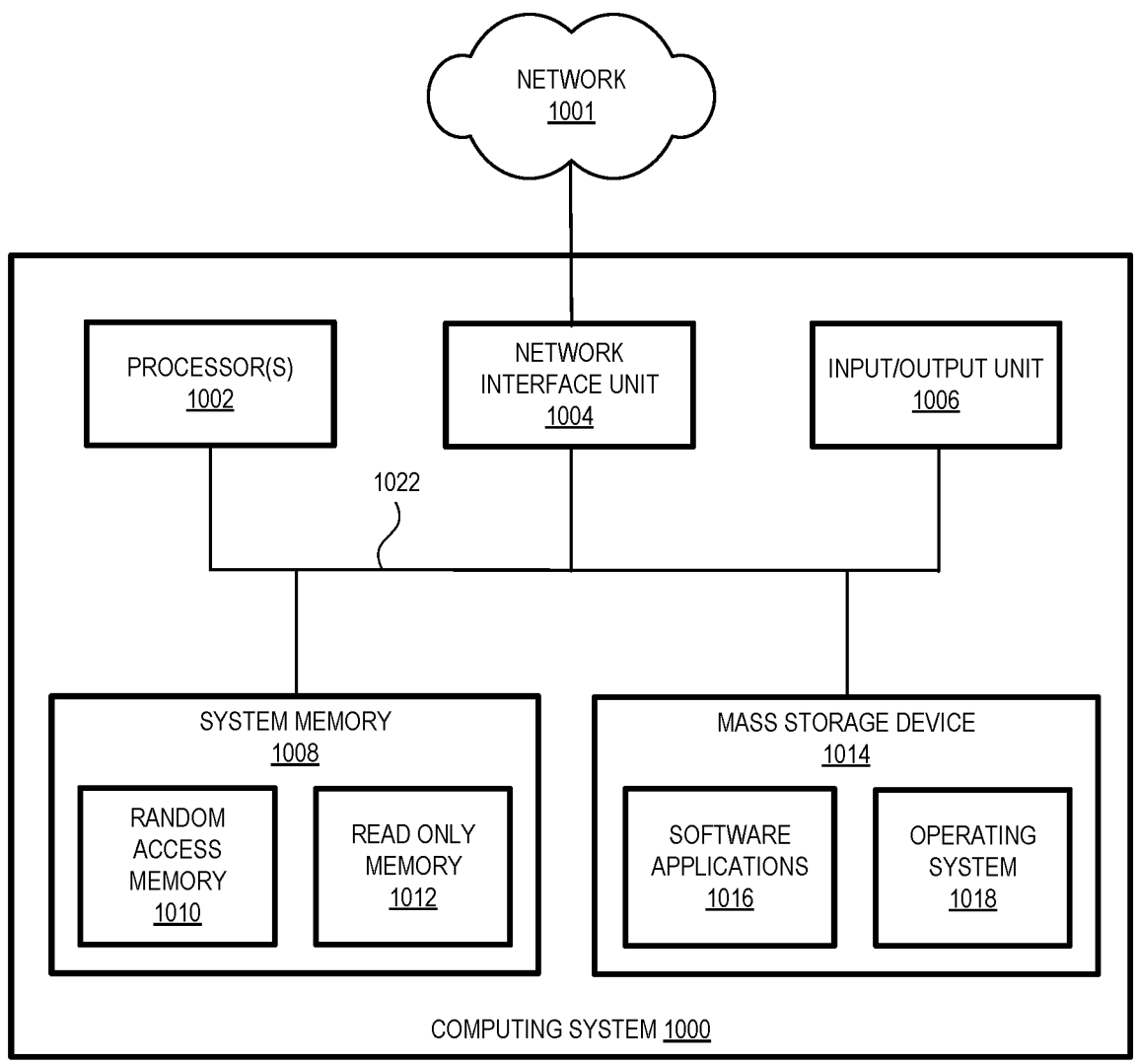
FIG. 10 illustrates an example block diagram of a computing system.

FIG. 10 illustrates an example block diagram of a virtual or physical computing system 1000. One or more aspects of the computing system 1000 can be used to implement the resource planning system 102, store instructions described herein, and preform operations described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of assigning attributes to images, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method, comprising:
receiving input media content data including input image data, the input image data comprising at least one image, wherein the at least one image has an associated context category;
automatically assigning, based at least in part on the context category of the at least one image, one or more annotations to the at least one image;
determining whether the at least one image requires additional annotation based on an observed annotation accuracy threshold;
if the at least one image does not require additional annotation:
storing the at least one image and its assigned annotations in a central database, wherein the central database is accessible to a plurality of enterprise users;
if the at least one image requires additional annotation:
assigning a priority to the at least one image, based on one or more enterprise factors, wherein the priority includes a position in a queue of a plurality of images, wherein each of the plurality of images requires additional annotation;
assigning, according to the assigned priority, one or more additional annotations to the at least one image; and
storing the at least one image and its assigned annotations and additional annotations in the central database.

2. The method of claim 1, further comprising:
receiving the at least one image from one or more stored input databases, wherein the at least one image is of a type selected from among:
an original image;
a video still image; and
a two-dimensional thumbnail image of a three-dimensional model;
at a context application, determining a context category of the at least one image, and
wherein the input image data is received from the context application.

3. The method of claim 1, wherein the input media content data is received from a real-time inputs source, wherein the at least one image is of an image of a plurality of retail products captured at a retail enterprise location, and wherein the context category of the at least one image is associated with the real-time inputs source.

4. The method of claim 3, wherein the input media content data is received from the real-time inputs source and from the context application.

5. The method of claim 1, wherein assigning the one or more annotations to the at least one image comprises, choosing one or more context-specific annotation models of a plurality of context-specific annotation models, based on the context category of the at least one image, where in the plurality of context specific annotation models may assign annotations of a type selected from among:
labels;
object recognition;
text recognition; and
color.

6. The method of claim 1, wherein the one or more enterprise factors are selected from among: safety factors, number of guests visiting a store aisle, emptiness of store shelves, background of an image, accuracy, quality of image, lighting quality, functionality of a camera, confidence level, and a user-defined prioritization of a designated image source.

7. The method of claim 1, further comprising:
observing a quality of assigned annotations;
detecting a change in the quality of assigned annotations; and
automatically altering at least one of the one or more enterprise factors based, at least in part, on the detected change in the quality of assigned annotations.

8. The method of claim 1, further comprising:
determining whether a context application or a context-specific annotation model needs to be retrained, based at least in part on an observed automated annotation success trend; and
retraining the context application or the context-specific annotation model using the at least one image and its assigned annotations and additional annotations.

9. A system comprising:
an annotation platform comprising a first computer system configured to:
receive input media content data including input image data, the input image data comprising at least one image, wherein the at least one image has associated with it a context category;
assign, at a context-specific annotation model, based at least in part on the context category of the at least one image, one or more annotations to the at least one image;
store the at least one image and the one or more annotations in a central database;
a prioritization platform, executing on a second computer system communicatively connected to the first computer system, instructions to:
determine whether the at least one image requires additional annotation;
if the at least one image does not require additional annotation:
store the at least one image and its assigned annotations in a central database, wherein the central database is accessible to a plurality of enterprise users;
if the at least one image requires additional annotation:
assign a priority to the at least one image, based on one or more enterprise factors, wherein the priority includes a position in a queue of a plurality of images, wherein each of the plurality of images requires additional annotation;
receive, from an annotating user, one or more additional annotations associated with the at least one image; and
store the additional annotations in the central database in association with the image.

10. The system of claim 9, wherein the input media content data is received from a context application, and wherein the context application is configured to:
receive the at least one image from one or more stored input databases, wherein the at least one image is of a type chosen from among:
an original image;
a video still image; and
a two-dimensional thumbnail image of a three-dimensional model; and determine a context category of the at least one image.

11. The system of claim 10, wherein the context application comprises a classification model and the context-specific annotation models comprise image recognition models trained using training data associated with a specific context.

12. The system of claim 9, wherein the input media content data is received from a real-time inputs source, and wherein the context category of the at least one image is associated with the real-time inputs source.

13. The system of claim 12, wherein the input media content data is received from the real-time inputs source and from the context application.

14. The system of claim 9, wherein assigning the one or more annotations to the at least one image comprises choosing one or more context-specific annotation models of a plurality of context-specific annotation models, based on the context category of the at least one image, wherein the plurality of context specific annotation models may assign annotations of a type selected from among:
- labels;
- object recognition;
- text recognition; and
- color.

15. The system of claim 9, wherein the one or more enterprise factors are selected from among: safety factors, number of guests visiting a store aisle, emptiness of store shelves, background of an image, accuracy, quality of image, lighting quality, functionality of a camera, confidence level, and a user-defined prioritization of a designated image source.

16. The system of claim 9, further comprising instructions to:
- determine whether a context application or a context-specific annotation model needs to be retrained, based at least in part on an observed automated annotation success trend; and
- retrain the context application or the context-specific annotation model using the at least one image and its assigned annotations and additional annotations.

17. The system of claim 9, further comprising instructions to:
- observe a quality of assigned annotations;
- detect a change in the quality of assigned annotations; and
- automatically alter at least one of the one or more enterprise factors based, at least in part, on the detected change in the quality of assigned annotations.

18. A method, comprising:
- receiving, at an annotation platform, input media content data from a real-time inputs source,
  wherein the input media content data includes input image data,
  wherein the input image data comprises a plurality of images,
  wherein each of the plurality of images has associated with it a context category,
  wherein the context category is associated with the real-time inputs source, and
  wherein the annotation platform comprises one or more annotation models;
- based on the context category associated with each of the plurality of images, assigning each of the plurality of images to at least one of the one or more annotation models;
- automatically assigning, based at least in part on the context category of each of the plurality of images, one or more annotations to each of the plurality of images;
- observing a quality of each of the assigned one or more annotations;
- determining, at a prioritization application, whether each of the plurality of images requires additional annotation, based at least in part on the observed quality of the one or more annotations assigned to each of the plurality of images;
- in response to observing an increase in quality of a first subset of the one or more annotations or no change in the quality of the first subset of the one or more annotations:
  - determining that a first subset of the plurality of images to which the first subset of the one or more annotations are assigned do not require additional annotation;
  - storing each image of the first subset and one or more assigned annotations assigned to each image of the first subset in a central database, wherein the central database is accessible to a plurality of enterprise users;
- in response to observing a decrease in quality of a second subset of the one or more annotations:
  - determining that a second subset of the plurality of images to which the second subset of the one or more annotations are assigned requires additional annotation;
  - assigning a priority to each image of the second subset, based at least in part on the observed decrease in quality,
    - wherein the priority includes a position in a queue, and
    - wherein the position in the queue defines an order of additional annotation;
  - assigning, according to the order of additional annotation, one or more additional annotations to each image of the second subset; and
  - storing each image of the second subset and the one or more assigned annotations and the one or more additional annotations assigned to each image of the second subset in the central database.

19. The method of claim 18, further comprising:
- in response to observing the decrease in quality of the second subset of the one or more annotations:
  - determine that at least one of the one or more annotation models needs to be retrained, based on the observed decrease in quality; and
  - retrain the at least one of the one or more annotation models using at least one or more images of the second subset and the one or more assigned annotations and the one or more additional annotations assigned to each image of the second subset.

20. The method of claim 18, wherein the real-time inputs source comprises a camera associated with a retail store.

21. The method of claim 18, wherein assigning a priority to each image of the second subset is based at least in part on one or more enterprise factors.

22. The method of claim 21, wherein the one or more enterprise factors are selected from among: safety factors, number of guests visiting a store aisle, emptiness of store shelves, background of an image, accuracy, quality of image, lighting quality, functionality of a camera, confidence level, and a user-defined prioritization of a designated image source.

23. The method of claim 21, further comprising:
- automatically altering at least one of the one or more enterprise factors based, at least in part, on the observed quality of each of the assigned one or more annotations.

24. The method of claim 18, wherein each of the plurality of images is of a type chosen from among:
   an original image; and
   a video still image.

\* \* \* \* \*